United States Patent [19]
Morizane et al.

[11] Patent Number: 5,794,876
[45] Date of Patent: Aug. 18, 1998

[54] SEAT BELT RETRACTOR WITH PRETENSIONER

[75] Inventors: Kenichi Morizane; Katsuyasu Ono, both of Kanagawa, Japan

[73] Assignee: NSK Ltd., Tokyo, Japan

[21] Appl. No.: 819,721

[22] Filed: Mar. 17, 1997

Related U.S. Application Data

[63] Continuation of Ser. No. 498,916, Jul. 6, 1995, abandoned.

[30] Foreign Application Priority Data

Jul. 6, 1994 [JP] Japan ............... 6-177662
Apr. 28, 1995 [JP] Japan ............... 7-129157

[51] Int. Cl.[6] .................................................. B60R 22/46
[52] U.S. Cl. ................................................... 242/374
[58] Field of Search ........................ 242/374; 280/806; 297/478, 480

[56] References Cited

U.S. PATENT DOCUMENTS

| | | |
|---|---|---|
| 3,386,683 | 6/1968 | Howland ................... 242/374 |
| 4,423,846 | 1/1984 | Fohl ........................ 242/374 |
| 4,434,953 | 3/1984 | Gemar et al. ............. 242/374 |
| 4,508,287 | 4/1985 | Nilsson .................... 242/374 |
| 5,313,690 | 5/1994 | Hiramatsu et al. ......... 24/641 |
| 5,364,168 | 11/1994 | Nishizawa et al. ........ 297/476 |
| 5,443,222 | 8/1995 | Mödinger et al. .......... 242/374 |

FOREIGN PATENT DOCUMENTS

| | | | |
|---|---|---|---|
| 0 582 096 | 2/1994 | European Pat. Off. | |
| 3220498 | 12/1983 | Germany | ........... 242/374 |
| 55-21696 | 5/1980 | Japan. | |

Primary Examiner—John M. Jillions
Attorney, Agent, or Firm—Evenson, McKeown, Edwards & Lenahan, P.L.L.C.

[57] ABSTRACT

A rack can transmit a rotational torque in a webbing winding and tightening direction to a take-up spindle of a retractor via a pinion gear. In the event of a vehicular collision, this rack is pushed and driven by gas pressure. To rotate at an increased speed an outer clutch ring which can intermittently transmit a torque to the take-up spindle via a clutch mechanism, a speed-increasing gear unit is arranged between the pinion gear and the outer clutch ring.

11 Claims, 16 Drawing Sheets

1

SEAT BELT RETRACTOR WITH PRETENSIONER

This application is a continuation of application Ser. No. 08/498,916, filed on Jul. 6, 1995, now abandoned.

BACKGROUND OF THE INVENTION

1. Field of the Invention

This invention relates to a seat belt retractor having a pretensioner so that slack of a webbing can be eliminated in the event of an emergency by winding up the webbing on a take-up spindle of the retractor.

2. Description of the Related Art

In a seat belt system for protecting an occupant in safety in a seat of a vehicle, it has heretofore been tended to lower the webbing-winding force of its retractor with a view toward making the occupant feel less that he is wearing a webbing. This however inevitably results in greater slack of the webbing, leading to the potential danger that, if a large force is applied to the webbing in the event of an emergency such as collision of the vehicle, the webbing may be pulled out over a longer length, thereby failing to effectively restrain his body.

With a view toward eliminating such slack of the webbing by winding in the webbing in the event of an emergency, there have been proposed retractors which are each equipped with a pretensioner assembled therein to instantaneously rotate its take-up spindle in a winding direction.

Such pretensioners include those of the type that as disclosed, for example, in U.S. Pat. No. 5,364,168 issued Nov. 15, 1994 to Muneo Nishizawa, et al., a drive member such as a pulley is rotated by actuation of drive means such as a pulling cable drive unit to tighten the wound webbing. The drive member for such a pretensioner is connected to a take-up spindle via engaging means so that, to avoid interference with rotation of the take-up spindle of the retractor during normal use, the engaging means is maintained out of engagement with the take-up spindle while the pretensioner is not actuated but is connected to the takeup spindle to transmit a rotational torque to the takeup spindle upon actuation of the pretensioner. Use of meshing means like a gear as the engaging means allows the drive member to efficiently transmit a rotational torque to the take-up spindle.

On the other hand, the pretensioner disclosed, for example, in Japanese Utility Model Publication (Kokoku) No. SHO 55-21696 published May 24, 1980 is composed of a piston rod arranged for instantaneous sliding movement within a cylinder by a gas pressure and a rack engageable with a gear fixedly secured on a webbing take-up spindle in response to movement of the piston rod so that the take-up spindle is rotated in a webbing-winding direction. When the piston rod and the rack are caused to move by a gas pressure upon collision of a vehicle, the rack is brought into engagement with the gear so that the gear is rotated to wind the webbing into the retractor.

The above-described construction of the pretensioner disclosed in U.S. Pat. No. 5,364,168—when a cable such as a wire rope is used as means for transmitting a drive force of the drive means, e.g., a piston as a rotational force for the take-up spindle—however requires to take into account an extra take-up amount of the cable required for bringing the drive member into engagement with the take-up spindle in addition to a take-up amount of the cable required to achieve a desired degree of tightening of the webbing wound on the take-up spindle. As a consequence, a greater piston stroke is needed, resulting in a larger pretensioner so that the mountability of the retractor on a vehicle is reduced. Further, high-pressure gas generated from a gas generator leaks out through a spacing between a wall of a wire rope sliding channel in a manifold case and the wire rope so that the pressure of the gas cannot be effectively used as a drive force for the drive means.

According to the above-described construction of the pretensioner disclosed in Japanese Utility Model Publication (Kokoku) No. SHO 55-21696, it is necessary to provide a rack stroke as much as the length of the webbing to be tightened. A longer cylinder and rack are therefore needed, resulting in a larger pretensioner so that the mountability of the retractor on a vehicle is reduced.

Further, in the construction of each of these pretensioners, the pulley or rack subsequent to completion of its webbing tightening operation is not prevented from rotating or moving in the webbing winding-out direction. It is therefore impossible to prevent winding-out of the webbing until the rotation of the take-up spindle in the webbing winding-out direction is inhibited by an emergency lock mechanism. Upon bringing the pulley and the take-up spindle or the rack and the gear as the above-described engaging means into meshing engagement in the event of an emergency of a vehicle, their teeth are not in engagement with each other at an initial stage. Their teeth may therefore be broken if the drive means is actuated and the teeth hit each other at tips thereof.

SUMMARY OF THE INVENTION

An object of the present invention is therefore to overcome the above-described problems and to provide a compact seat belt retractor with a pretensioner, said retractor being capable of effectively using a gas pressure of drive means and smoothly transmitting a webbing-tightening drive force to a take-up spindle and also enabling to prevent extension of the webbing after completion of a tightening operation of the wound webbing.

In one aspect of the present invention, there is thus provided a seat belt retractor with a pretensioner, comprising:

a rack;

drive means for causing said rack to linearly move in a first direction;

a pinion gear arranged in meshing engagement with said rack so that said pinion gear is rotated in a first direction of rotation by movement of said rack in said first direction;

a rotary drive member rotatable in said first direction of rotation by rotation of said pinion gear in said first direction of rotation;

a retractor base;

a take-up spindle supported for rotation on said retractor base and biased in a webbing-winding direction; and a clutch mechanism disposed between said rotary drive member and said take-up spindle to transmit rotation of said rotary drive member in said first direction of rotation to said take-up spindle, said clutch mechanism normally maintaining said rotary drive member and said take-up spindle in a non-connected state but, when said rotary drive member rotates in said first direction of rotation, bringing said rotary drive member and said take-up spindle into a connected state.

Preferably, the clutch mechanism can comprise:

a clutch ring fixed on the take-up spindle and having a circular outer circumference;

an engaging element;

a holder supported on the retractor base and holding the engaging element at a predetermined position; and a cam surface formed on the rotary drive member and forming a wedge-shaped spacing which flares in the first direction of rotation of the rotary drive member.

The holder can desirably be attached to the retractor base via means for producing rotational resistance between the holder and the retractor base when a rotational torque of at least a predetermined value is applied from the engaging element.

The resistance producing means can preferably comprise:

a holding tab portion which is normally maintained in engagement with an engaged portion of a holder base mounted on the retractor base but, when a rotational torque of at least a predetermined value is applied to the holder, is released from the engagement and is then brought into contact with the holder base to produce frictional resistance.

The resistance producing means can preferably comprise:

an acting member formed on the holder; and an acted member attached to the retractor base and located on a moving path of the acting member so that the acted member is deformable by the acting member.

The acting member can preferably be an edge portion formed on the holder, the acted portion is an annular rib of the holder base, and the annular rib is sheared off by the edge portion.

The holder can preferably comprise a holding finger for holding the roller pin, and openings are formed in the holding finger at parts thereof opposing the clutch ring and the cam surface, respectively.

The seat belt retractor can further comprise:

a speed-increasing gear transmission arranged between the pinion gear and the rotary drive member so that rotation of the pinion gear is transmitted at an increased speed to the rotary drive member.

The speed-increasing gear transmission may desirably comprise:

a rotating disc arranged in meshing engagement with the pinion gear;

an internal gear mounted on a retractor base;

a planetary gear supported for rotation on a pin disposed on the rotating disc and maintained in meshing engagement with the internal gear; and an external gear arranged on an outer periphery of the rotary drive member and maintained in meshing engagement with the planetary gear.

Preferably, the retractor base can be provided with positioning means useful upon assembly of the planetary gear.

The seat belt retractor can further comprises:

a return preventing mechanism for preventing the rack from linearly moving a second direction which is opposite to the first direction of linear movement.

The return preventing mechanism can preferably comprise:

a rack gear case provided with a cam surface and fixed on the retractor base, the cam surface forming a wedge-shaped space flaring in the first direction of linear movement of the rack;

a dog disposed in the wedge-shaped space; and a biasing member biasing the dog in a direction in which the wedge-shaped space becomes narrower.

When the rack is caused to linearly move in the first direction by the drive means, the pinion gear is brought into meshing engagement with the rack so that the pinion gear is rotated in the first direction of rotation. By the rotation of the pinion gear in the first direction, the rotary drive member is rotated in the first direction of rotation. This rotation of the rotary drive member is transmitted to the take-up spindle by the clutch mechanism, whereby the take-up spindle is rotated in the webbing-winding direction.

Even with a short rack stroke, the rack can fully rotate the take-up spindle in the webbing-winding direction. The clutch mechanism is arranged between the take-up spindle and the rotary drive member so that the teeth of the pinion and rack are can be brought into engagement with each other even in an initial stage.

BRIEF DESCRIPTION OF THE DRAWINGS

The above and other objects, features and advantages of the present invention will become apparent from the following description and the claims, taken in conjunction with the accompanying drawings, in which:

DETAILED DESCRIPTION OF THE INVENTION AND PREFERRED EMBODIMENTS

Figure 1:
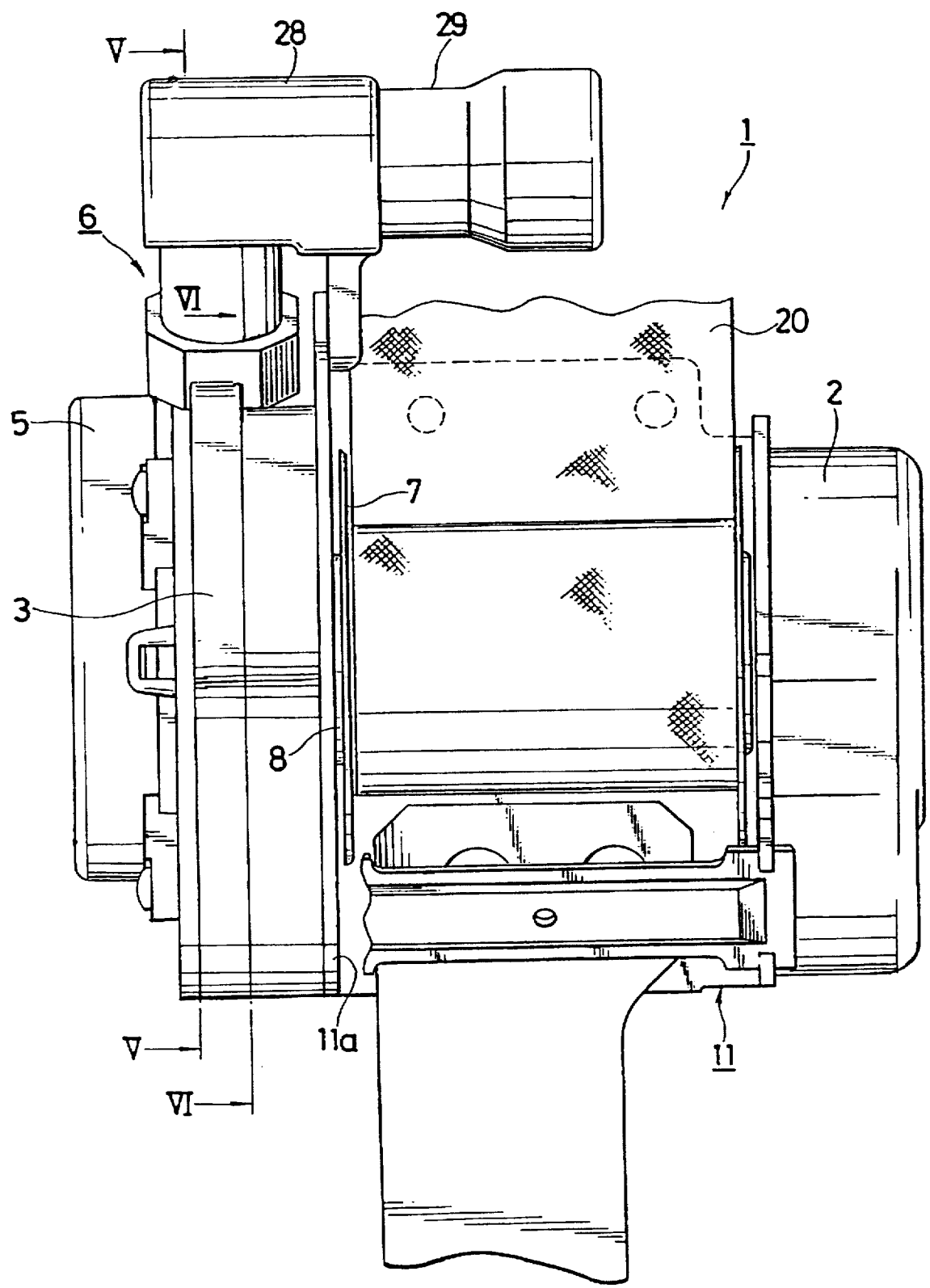
FIG. 1 is a front view of a seat belt retractor with a pretensioner (which may hereinafter be called a "pretensioner-equipped seat belt retractor"), said seat belt retractor pertaining to a first embodiment of the present invention.
Figure 2:
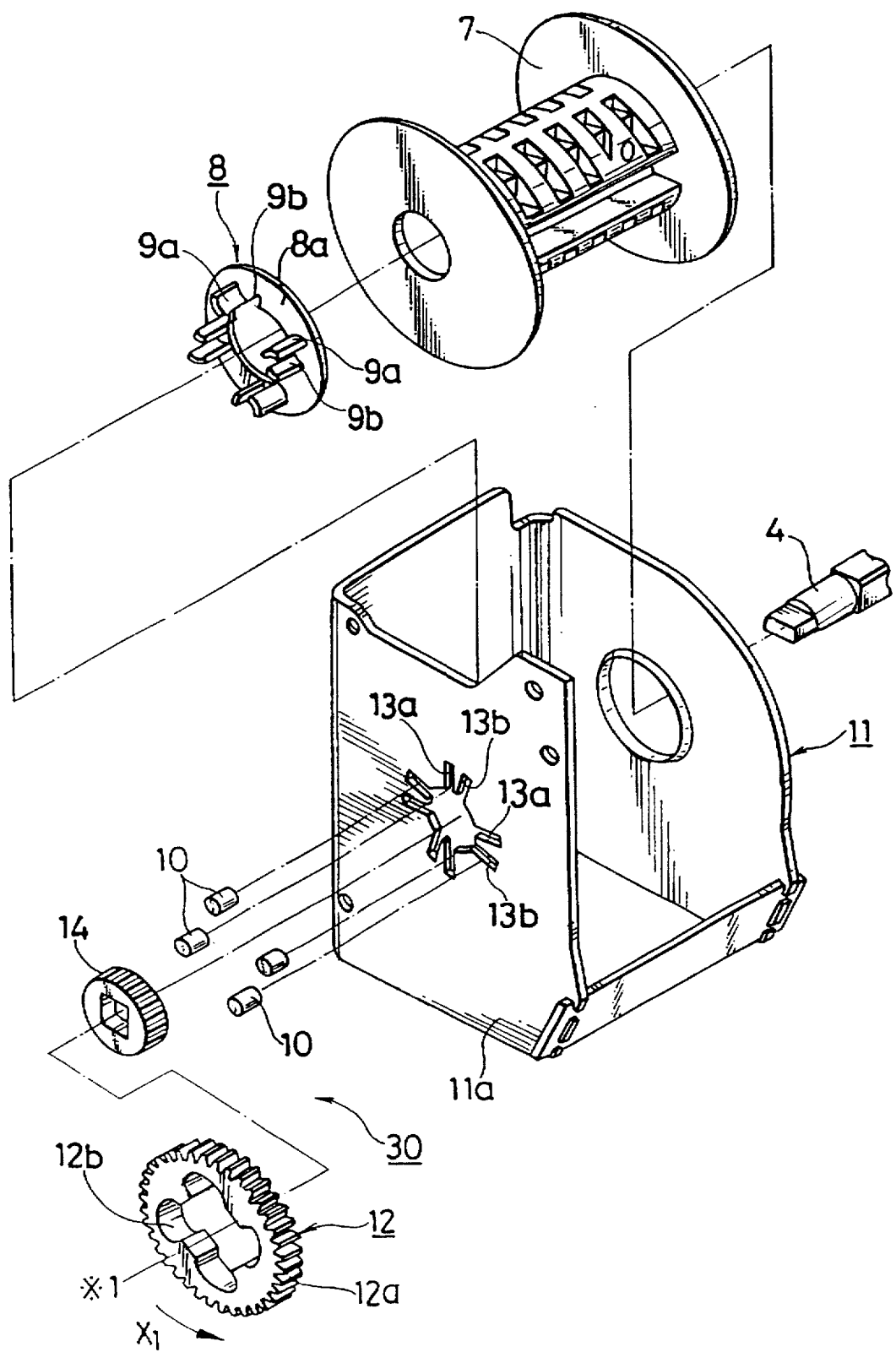
FIG. 2 is an exploded fragmentary view of the pretensioner-equipped seat belt retractor shown in FIG. 1.
Figure 3:
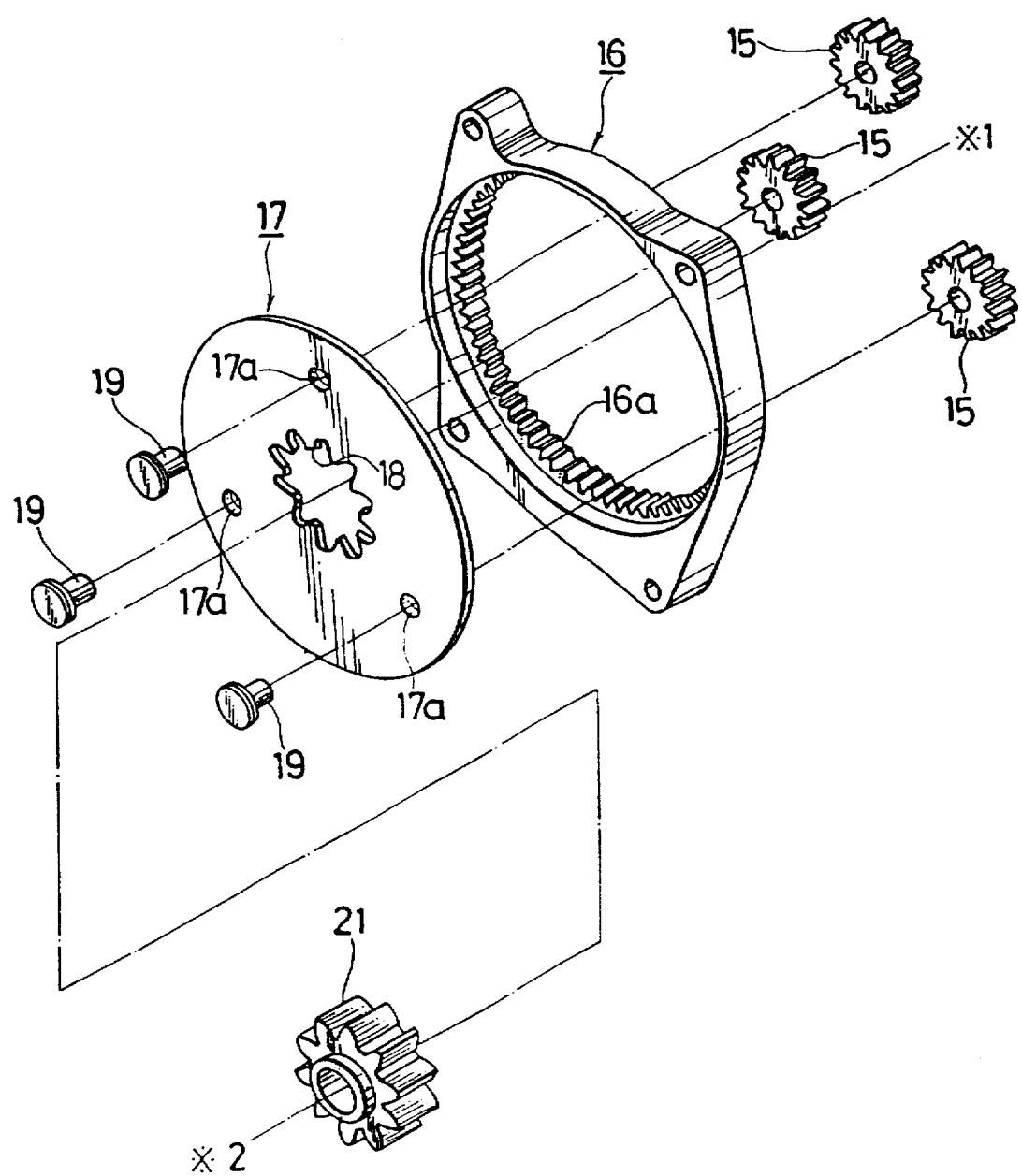
FIG. 3 is another exploded fragmentary view of the pretensioner-equipped seat belt retractor shown in FIG. 1.
Figure 4:
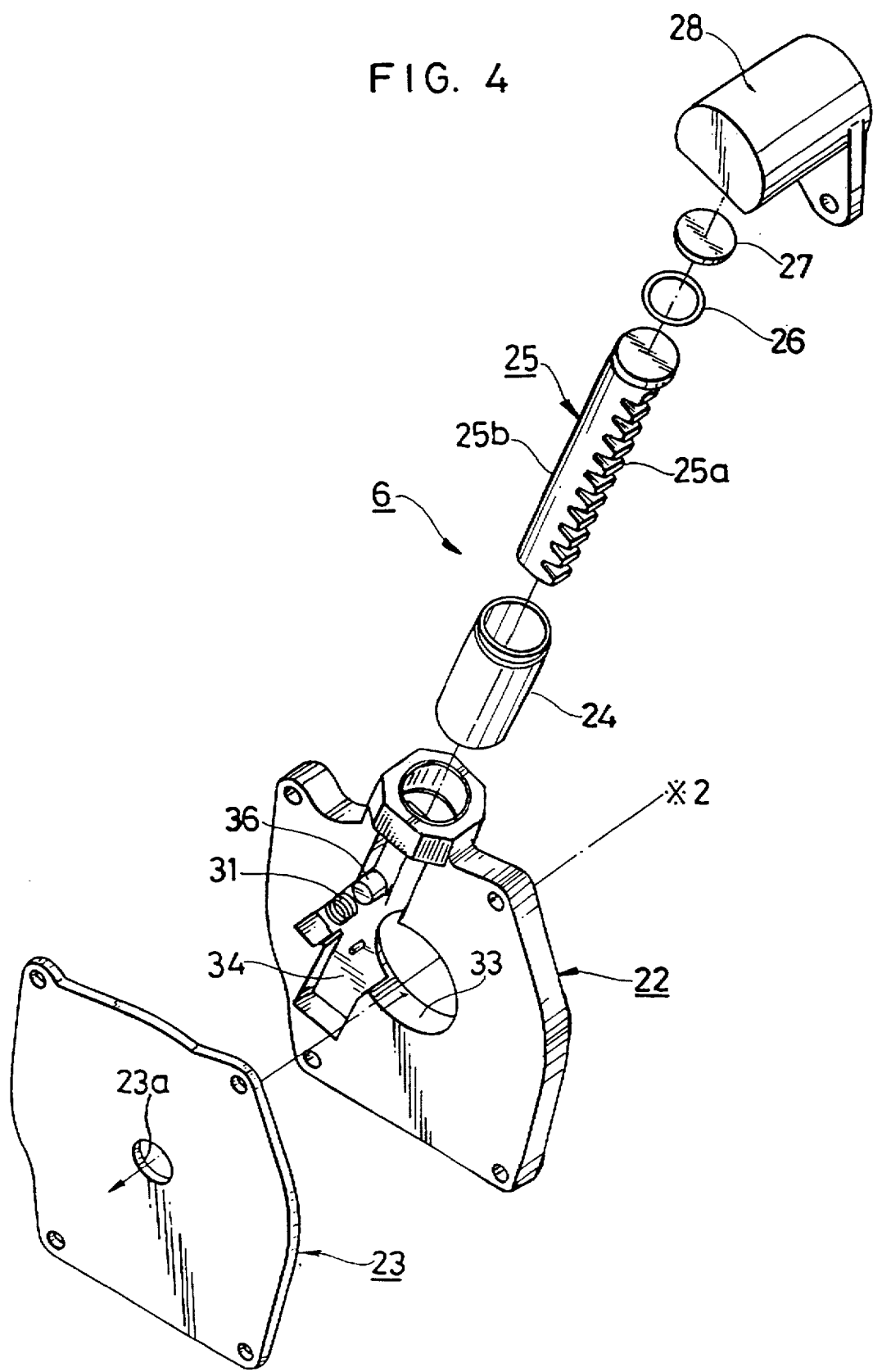
FIG. 4 is a further exploded fragmentary view of the pretensioner-equipped seat belt retractor shown in FIG. 1.

The pretensioner-equipped seat belt retractor 1 according to the first embodiment of the present invention will first be described with reference to FIGS. 1 through 7.

The pretensioner-equipped seat belt retractor, which is designated at numeral 1, is provided with a take-up reel 7 on which a webbing 20 is wound in such a way that the webbing 20 can be wound in or out. Like conventional retractors, the take-up reel 7 is normally biased in a direction, in which the webbing 20 is wound in, by a winding spring unit 5 connected to a take-up spindle 4 of the take-up reel 7. As soon as the webbing 20 is about to be wound out at an acceleration of at least a predetermined value, rotation of the take-up spindle 4 is inhibited by an emergency lock mechanism 2 so that the webbing 20 cannot be wound out any further.

In the pretensioner-equipped seat belt retractor 1, a pretensioner 3 provided with drive means for rotating the take-up spindle 4 in a direction in which slack of the webbing 20 is eliminated is arranged on one of side walls 11a of a retractor base 11 formed substantially in a square U-shape. The pretensioner 3 is provided with an outer clutch ring 12 as a rotary drive member capable of intermittently transmitting a torque to the take-up spindle 4 via a clutch mechanism 30, drive means 6 for rotating and driving the outer clutch ring 12 by a pinion gear 21 maintained in meshing engagement with a rack 25 which is pushed and driven by the pressure of gas generated by a gas generator 29, a planetary gear unit 35 arranged as a speed-increasing gear transmission between the pinion gear 21 and the outer clutch ring 12 to rotate at an increased speed the outer clutch ring 12 upon rotation of the pinion gear 21, and an unillustrated control unit for actuating the gas generator 29 in the event of a collision of a vehicle.

The outer clutch ring 12 is a cylindrical member, which is arranged rotatably relative to the take-up spindle 4 about a central axis of a clutch ring 14 having a circular outer periphery and fitted on an end portion of the take-up spindle 4 extending through the side wall 11a and which is rotated and driven by the drive means 6 via the planetary gear transmission 35 to be described subsequently herein. Formed on an outer peripheral surface are external teeth 12a for forming a sun gear arranged in engagement with planetary gears 15 of the planetary gear unit 35. In addition, four cam surfaces 12b are formed at equal intervals in an angular direction on an inner peripheral surface formed by hollowing out the outer clutch ring 12. Formed between the cam surfaces 12b and an outer peripheral surface of the clutch ring 14 are wedge-shaped spaces which become broader in the direction of rotation of the outer clutch ring 12. In each of the wedge-shaped spaces, a cylindrical roller pin 10 which is a dog movable in the direction of engagement of the clutch ring 14 is arranged to permit transmission of a torque between the outer clutch ring 12 and the clutch ring 14. In combination with a holder 8 secured as holding means on the side wall 11a to prevent movement of the roller pins 10 in a clutch ring engaging direction, the roller pins 10 make up the clutch mechanism 30 (see FIG. 6).

The holder 8 is made of a synthetic resin material such as a polyacetal or nylon or a metallic material such as aluminum or zinc, and is provided with an annular base plate portion 8a and four pairs of roller pin holding fingers 9a,9b. The base plate portion 8a defines a circular hole through which the take-up spindle 4 is inserted. The roller pin holding fingers 9a,9b are disposed at right angles on the base plate portion 8a so that the roller holding fingers 9a,9b extend along an axis of the base plate portion 8a. The roller pin holding fingers 9a,9b extend through retaining slots 13a,13b, respectively, which are formed through side wall 11a, whereby the roller pin holding fingers 9a,9b extend out to the outside of the side wall 11a. The base plate portion 8a is therefore arranged on the retractor in such a way that the base plate portion 8a is held between a flange portion of the take-up reel 7 and the side wall 11a. Tip portions of the roller pin holding fingers 9a,9b are inserted in the respective wedge-shaped spaces in the outer clutch ring 12 disposed on an outer side of the side wall 11a, whereby the roller pins 10 are held out of engagement with the outer peripheral surface of the clutch ring 14.

The inner diameter of the outer clutch ring 12 is greater than the outer diameter of the clutch ring 14, and the roller pins 10 held between the corresponding roller pin holding fingers 9a,9b of the holder 8 are positioned with a clearance relative to the outer peripheral surface of the clutch ring 14. Namely, the roller pins 10 are held by the holder 8 in the state that absolutely no torque can be transmitted.

During normal use, the retractor therefore seldom develops such a problem that due to vibrations or a like cause, the roller pins 10 held by the holder 8 may contact the clutch ring 14 to interfere with winding-out or winding-in of the webbing 20 from or into the retractor or the function of the emergency lock mechanism 2 or may produce abnormal noise.

Each pair of roller pin holding fingers 9a,9b holds the corresponding roller pin 10 in such a way that, when seen in a plane parallel to the base plate portion 8a, the roller pin holding fingers 9a,9b face against each other and extend in the direction of the periphery of the base plate portion 8a. When the paired roller pin holding fingers 9a,9b is taken as a single piece member, the roller pin 10 is exposed at its outer peripheral surface portions which are located opposite the clutch ring 14 and the corresponding cam surface 12b of the outer clutch ring 12. A rotating drive force in the webbing-winding direction is therefore applied to the outer clutch ring 12 and, even when the outer clutch ring 12 suddenly rotates, the roller pins 10 can be held standstill relative to the side wall 11a. The roller pin holding fingers 9a,9b can therefore limit movement of the roller pins 10 in the angular direction until the roller pins 10 are surely brought into engagement with the clutch ring 14.

Moreover, when the outer clutch ring 12 is rotated over a predetermined angle and the roller pins 10 are biased toward a central axis of the take-up spindle 4 by the respective cam surfaces 12b, the roller pin holding fingers 9a,9b can readily undergo deformation so that the roller pin holding fingers 9a,9b will not interfere with movement of the roller pins in the engaging direction. When the outer clutch ring 12 is rotated further in the webbing-winding direction, the roller pin holding fingers 9a,9b are broken off from the base plate portion 8a so that the roller pins 10 are brought into engagement with clutch ring 14 rotate in the webbing-winding direction integrally with the outer clutch ring 12. The clutch ring 14 is made of a material harder than the roller pins 10, and its outer peripheral surface has been knurled to facilitate its engagement with the roller pins 10.

Described specifically, when a rotating drive force is applied in the webbing-winding direction (the direction indicated by arrow $X_1$ in FIG. 2) to the outer clutch ring 12 by the drive means 6 which will be described subsequently herein, the roller pins 10 are caused to enter between the cam surfaces 12b of the outer clutch ring 12 and the outer peripheral surface of the clutch ring 14 so that the roller pins 10 connect the clutch ring 14 and the outer clutch ring 12 to each other and a rotational torque of the outer clutch ring 12 is transmitted to the take-up spindle 4.

The planetary gear unit 35 comprises three planetary gears 15 arranged between internal teeth 16a, which is formed on a planetary gear case 16 fixed on an outer side of the side wall 11a, and a rotating disc 17 as a carrier member rotatably supporting these planetary gears 15 thereon. Formed through the rotating disc 17 are through-holes 17a, in which pins 19 with the planetary gears 15 rotatably supported thereon are press-fitted, and a central hole 18 in which the pinion gear 21 is fitted. The planetary gears 15 are caused to revolve by the rotating disc 17 which rotates integrally with the pinion gear 21. Accordingly, the outer clutch ring 12 is rotated at an increased speed by rotation of the pinion gear 21.

The drive means 6 has the rack 25 with rack teeth 25a formed thereon, said rack teeth 25a being meshed with the pinion gear 21, a cylinder 24 with the rack 25 movably received therein, and a gas generator case 28 communicating and connecting an end portion of the cylinder 24 with a gas blow-out portion of the gas generator 29. A basal end portion of the cylinder 24 is connected to a rack gear case 22 fixed on an outer wall of the planetary gear case 16. Formed in the rack gear case 22 are a central hole 33, in which the pinion gear 21 is rotatably accommodated, and a recessed guide portion 34 communicated at a part thereof to the central opening 33 and adapted to guide sliding movement of the rack 25. On an outer wall of the rack gear case 22, a plate 23 through which an opening 23a is formed is disposed in such a way that the plate 23 covers the pinion gear 21 and the rack 25. Through the opening 23a, a free end portion of the take-up spindle 4 extends.

On an end portion of the rack 25, said end portion being located on a side of the gas generator case 28, are arranged a cushioning member 26 made of a synthetic resin, rubber or a porous metal and a piston 27 slidable in the cylinder 24. High-pressure gas produced from the gas generator 29 is fed to the piston 27 via the gas generator case 28. Depending on the design, the cushioning member is not needed so that the piston and the rack can be fabricated as an integral unit. Further, an O-ring can be used as the cushioning member to achieve gas-shielding effects.

Figure 5:
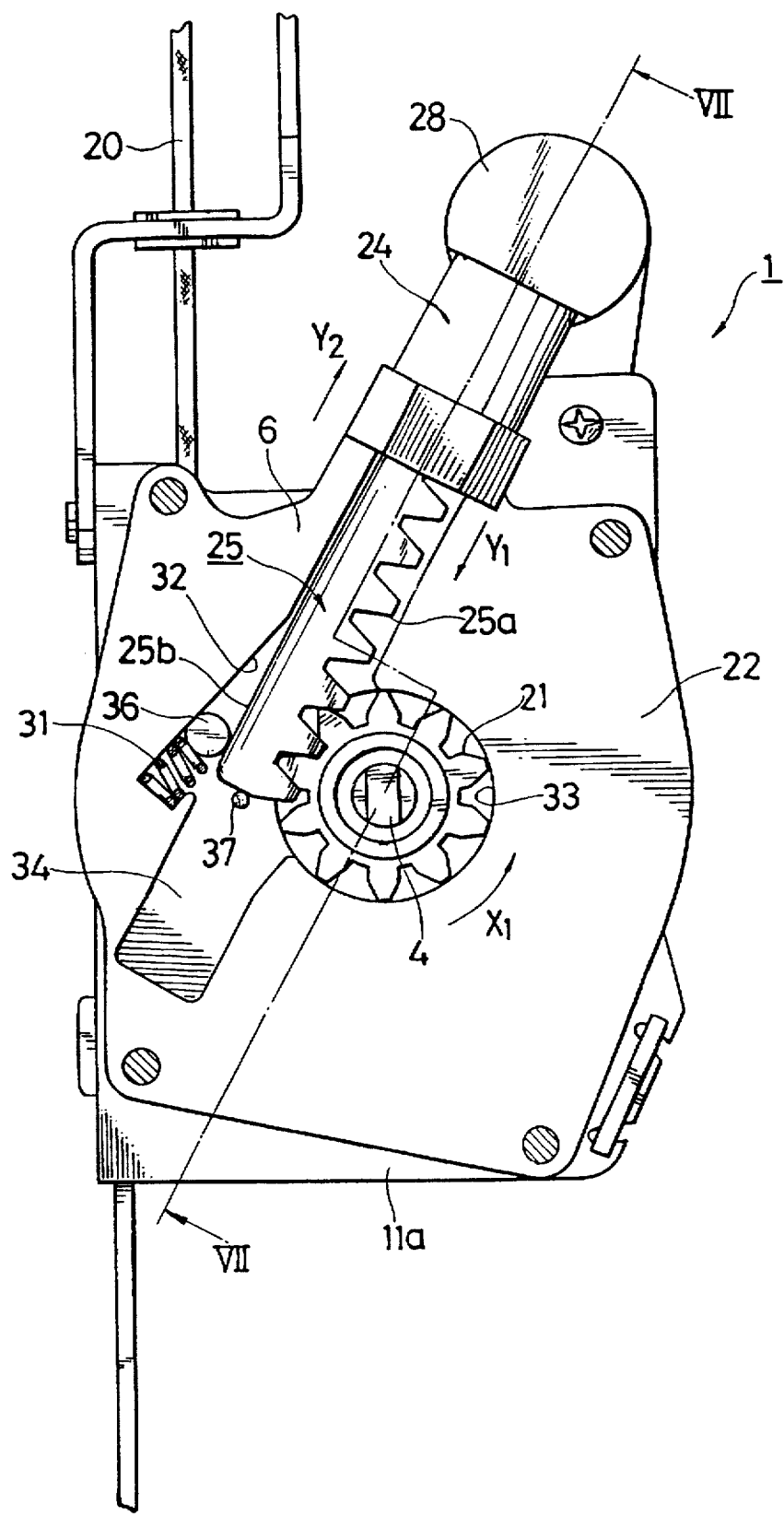
FIG. 5 is a cross-sectional view of the pretensioner-equipped seat belt retractor shown in FIG. 1, taken in the direction of arrows V—V.

On a side wall portion of the recessed guide portion 34, said side wall portion being on a side opposing a back surface 25b of the rack 25, there is formed a cam surface 32 which in turn forms a wedge-shaped space flaring in the direction of movement of the rack 25 (i.e., the direction indicated by $Y_1$ in FIG. 5). Arranged inside the wedge-shaped space are a cylindrical roller pin 36 and a coil spring 31 biasing the roller pin 36 in a rack-engaging direction. The cylindrical roller pin 36, as a dog, limits movement of the rack 25 in a returning direction (i.e., the direction indicated by $Y_2$ in FIG. 5) relative to the side walls and a bottom wall of the recessed guide portion 34 of the rack gear case 22. The roller pin 36 and the coil spring 31 therefore make up a return-preventing mechanism for the rack 25. When the rack 25 moves in the webbing-winding direction (the direction indicated by $Y_1$ in FIG. 5), the roller pin 36 is movable in a non-engaging direction against the biasing force of the coil spring 31 so that the movement of the rack 25 is not prevented.

Further, an initial positioning pin 37 for defining an initial position of the rack 25 upon its assembly is planted on the bottom wall of the recessed guide portion 34 to improve the assembling readiness of the rack 25 and the planetary gear unit 35. The initial positioning pin 37 is made of a resin and, when the rack 25 is driven under pressure, is readily broken. It is however to be noted that the initial positioning pin 37 is not essential.

A description will next be made of the operation of the above-described pretensioner-equipped seat belt retractor 1.

Figure 6:
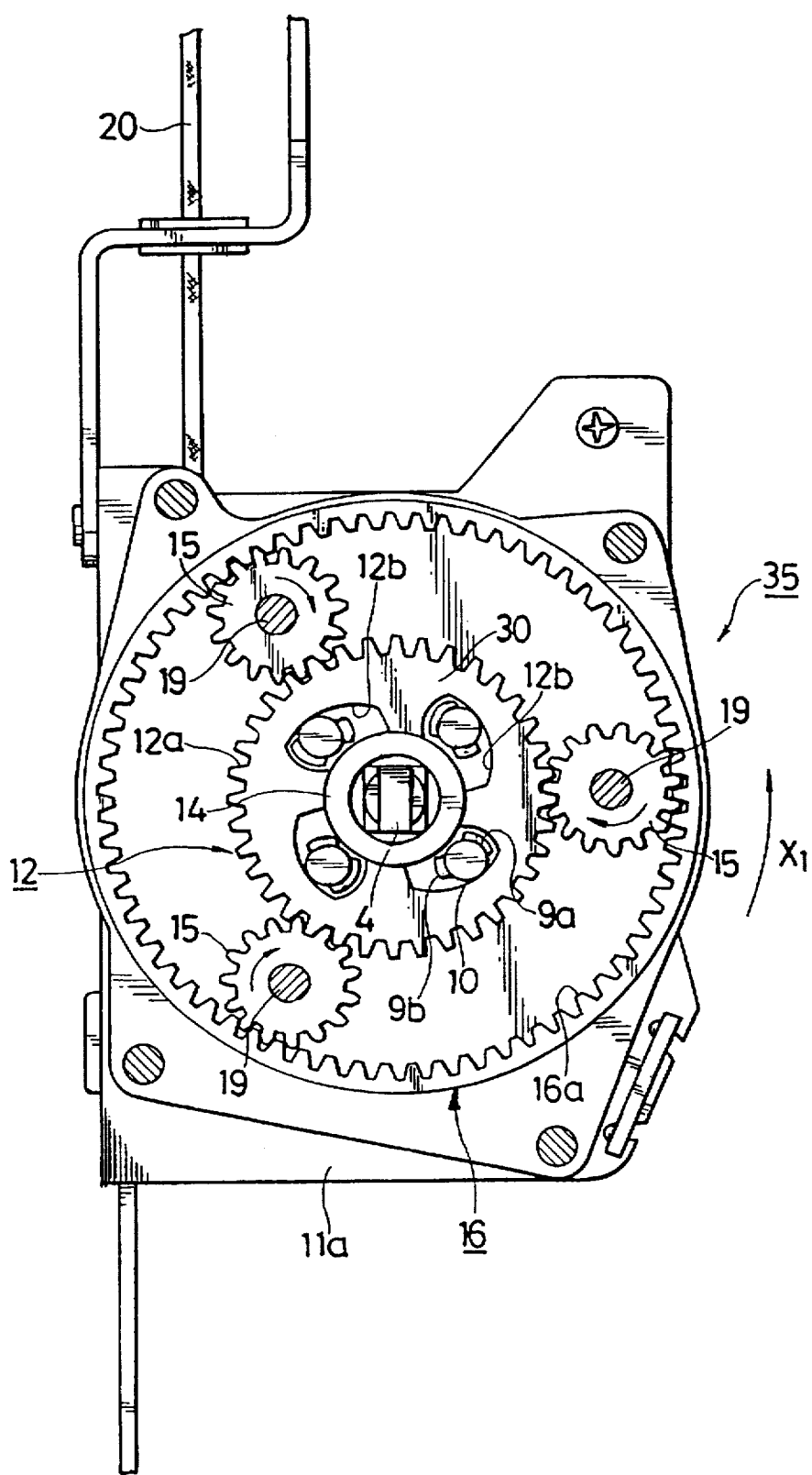
FIG. 6 is a cross-sectional view of the pretensioner-equipped seat belt retractor shown in FIG. 1, taken in the direction of arrows VI—VI.
Figure 7:
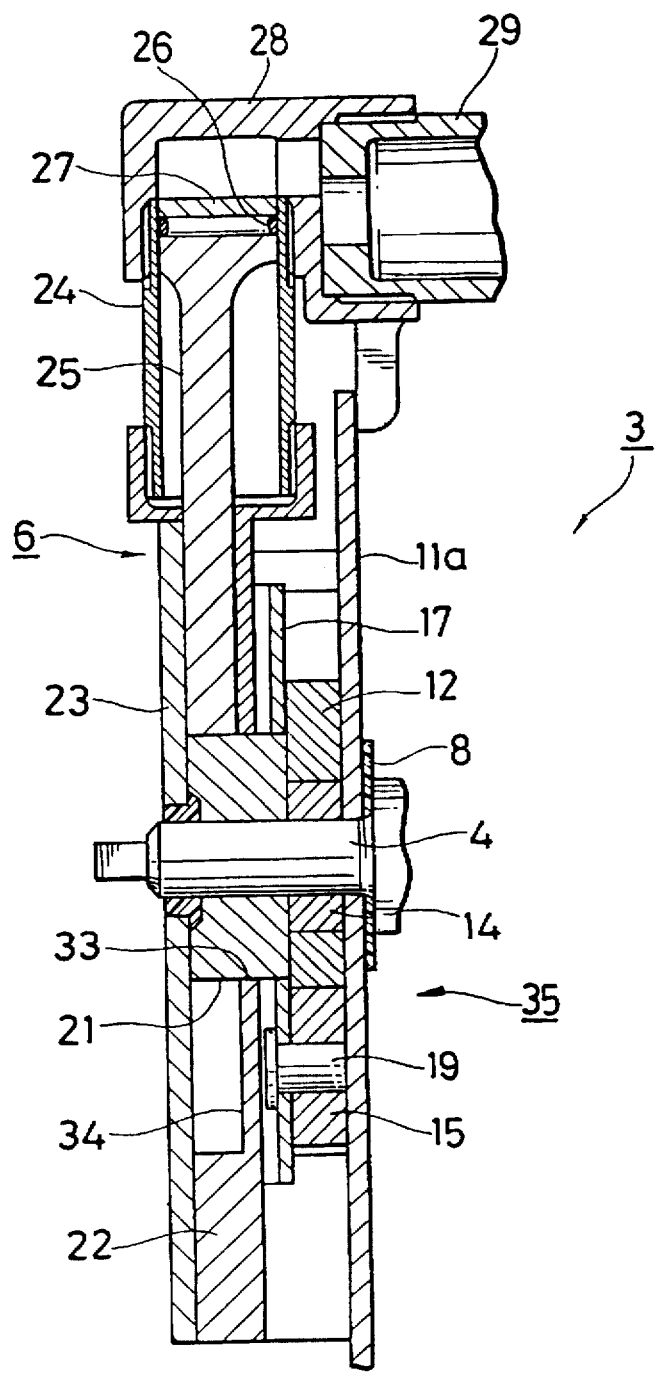
FIG. 7 a cross-sectional view of the pretensioner-equipped seat belt retractor shown in FIG. 5, taken in the direction of arrows VII—VII.

During normal running of a vehicle, the outer clutch ring 12 and the roller pins 10 are out of engagement with the clutch ring 14 as illustrated in FIG. 6 so that the take-up spring is freely rotatable. It is therefore possible to wind in the webbing 20 under the biasing force of the take-up spring unit 5 and also to wind out the webbing 20 against the biasing force.

When a deceleration of at least a predetermined value occurs on the vehicle due to sudden braking or the like, the passenger is caused to sway forwards so that the webbing 20 is about to be wound out at a certain acceleration. The emergency lock mechanism 2 of the retractor actuates at this time, thereby locking rotation of the take-up spindle 4. As a result, the webbing 20 is prevented from extending out any further. However, the unillustrated control unit does not actuate the gas generator 29 so that the rack 25 is not pushed, i.e., not driven.

When a deceleration of at least an extremely large predetermined value occurs as in the case of collision of the vehicle, on the other hand, the unillustrated control unit detects the deceleration to ignite the gas generator 29. The thus-ignited gas generator 29 blows out drive gas into the gas generator case 28. The expanding pressure of the drive gas which has flowed in the cylinder 25 from the gas generator case 28 then acts on the piston 27, whereby the piston 27 pushes, in other words, drives via the cushioning member 26 the rack 25 in the webbing-winding direction. At this time, the cushioning member 26 can reduce abrupt application of the gas pressure onto the rack 25.

Since the piston 27 is constructed to push and drive the rack 25, it is unnecessary to provide the gas generator case 28 with an opening through which a piston rod or the like extends to transmit a drive force. Therefore the gas pressure acts substantially in its entirety on the piston 27 without leakage and can be effectively used as a drive force for the rack 25.

When the rack 25 is pushed and driven in the direction indicated by arrow $Y_1$ in FIG. 5, the pinion gear 21 maintained in meshing engagement with the rack teeth 25a of the rack 25 is rotated and driven in the webbing-winding direction (i.e., the direction indicated by arrow $X_1$ in FIG. 5). Then, the rotating disc 17 which rotates integrally with the pinion gear 21 (see FIG. 3) rotates in the direction of arrow $X_1$.

The planetary gears 15, which are rotatably supported on the pins 19, are held on the rotating disc 17 and as shown in FIG. 6, the planetary gears 15 are in engagement with the internal teeth 16a of the planetary gear case 16 and also with the external teeth 12a of the outer clutch ring 12. Therefore, rotation of the rotating disc 17 in the direction of arrow $X_1$ causes the planetary gears 15 to revolve in the direction of arrow $X_1$ and further to rotate on their own axes while meshing with the internal teeth 6a of the planetary gear case 16, whereby the outer clutch ring 12 is rotated at an increased speed in the direction of arrow $X_1$. Accordingly, rotation of the pinion gear 21 in the direction of arrow $X_1$ is transmitted at an increased speed to the outer clutch ring 12 by the planetary gear unit 35.

When the outer clutch ring 12 is rotated in the direction of arrow $X_1$, the roller pins 10 are pushed toward the central axis of the take-up spindle 4 by the associated cam surfaces 12b. At this time, the roller pin holding fingers 9a,9b, owing to their resiliency or plastic deformation, permit the movement of the roller pins 10 toward the central axis of the take-up spindle 4 until the roller pins 10 surely engage in between the outer peripheral surface of the clutch ring 14 and the respective cam surfaces 12b.

Figure 8:
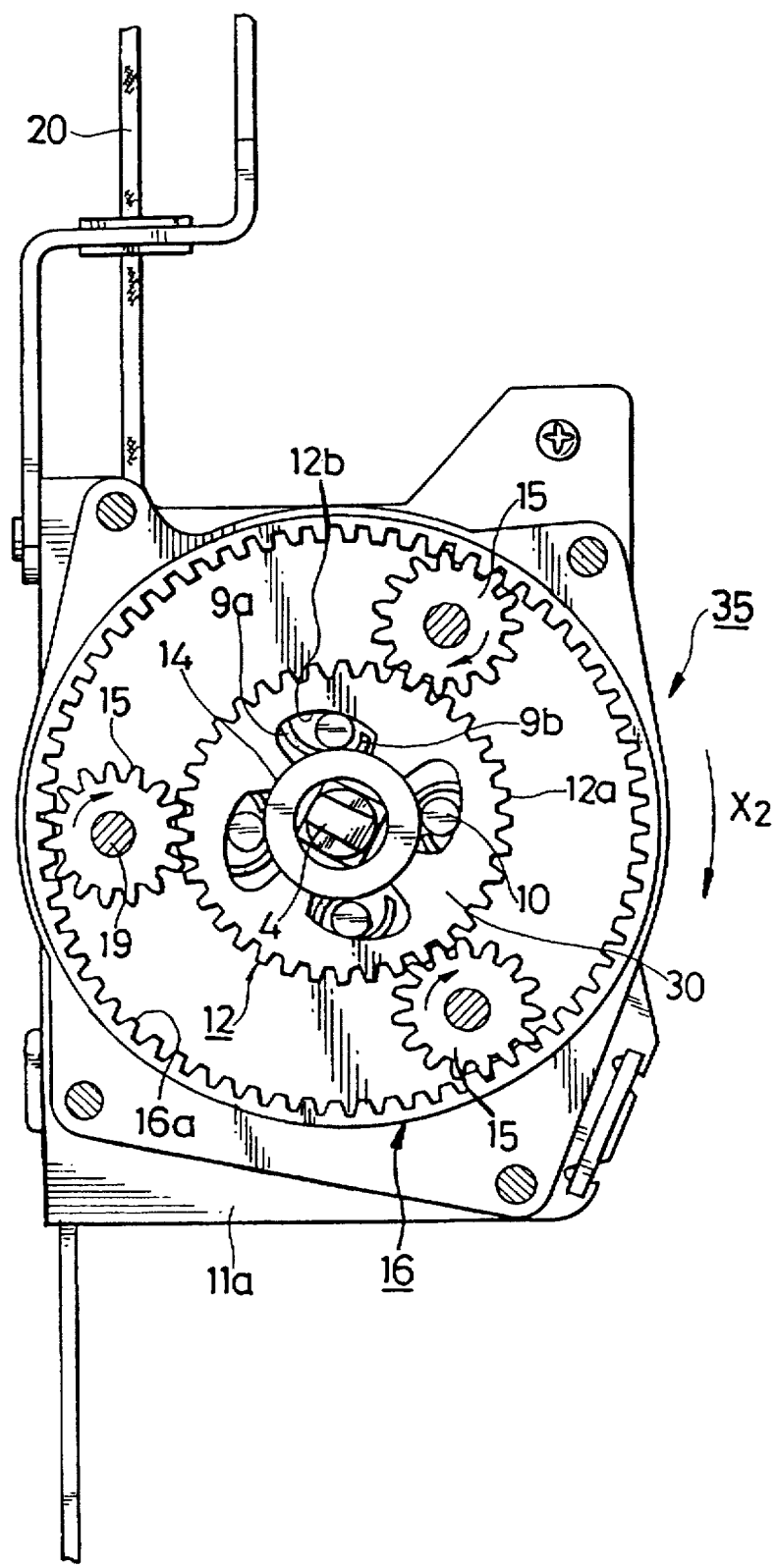
FIG. 8 is a fragmentary cross-sectional view of the pretensioner-equipped seat belt retractor, which is shown in FIG. 1, for explaining the manner of operation of a clutch mechanism depicted in FIG. 6.

When the roller pins 10 move to points where the roller pins 10 are assured to enter between the outer peripheral surface of the clutch ring 14 and the respective cam surfaces 12b, rotation of the outer clutch ring 12 is transmitted to the clutch ring 14 so that the clutch ring 14 and the roller pins 10 rotate in the direction of arrow $X_1$ integrally with the outer clutch ring 12. The roller pin holding fingers 9a,9b are therefore broken off as shown in FIG. 8.

When the pinion gear 21 is rotated and driven further in the webbing-winding direction by the drive force of the rack 25 pushed and driven by the expanding pressure of the drive gas, the outer clutch ring 12 which is rotating at an increased speed integrally rotates and drives the clutch ring 14 in the direction of arrow $X_1$ via the roller pins 10 so that the take-up spindle 4 is rotated in the webbing-winding direction. The webbing 20 is therefore wound in, whereby slack of the webbing is eliminated.

Accordingly, the rack 25 of the drive means 6, which can transmit rotation at an increased speed to the take-up spindle 4 via the planetary gear unit 35, can fully rotate the take-up spindle 4 in the webbing-winding direction even if the rack stroke is short. The rack 25 and the cylinder 24 can therefore be formed short, thereby making it possible to construct the pretensioner in small dimensions.

Arranged between the outer clutch ring 12, which constitutes the planetary gear unit 35 and is rotated at an increased speed, and the clutch ring 14 fixed on the take-up spindle 4 is the clutch mechanism 30 which keeps the outer clutch ring 12 and the clutch ring 14 disconnected as long as the pretensioner is not actuated. The teeth of the pinion gear 21, the rack 25 and the planetary gear unit 35 have already been in meshing in an initial stage in which the pretensioner has not been actuated. When the rack 25 is abruptly pushed and driven by the expanding pressure of the drive gas, the above teeth do not hit each other at their tips. This has made it possible to avoid breakage of the teeth and also to smoothly transmit a drive force of the drive means 6 to the take-up spindle 4.

When the pushing drive of the rack 25 by the expanding pressure of the drive gas stops, the take-up spindle 4 rotates in the webbing-releasing direction (i.e., the direction indicated by arrow $X_2$ in FIG. 8) under a tensile force of the webbing 20 so that the outer clutch ring 12 and the pinion gears 21 begin to rotate in the opposite direction. The rack 25 then becomes about to move in the return direction relative to the side walls and the bottom walls of the recessed guide portion 34 (in the direction of arrow $Y_2$ in FIG. 5).

However, the roller pin 36 enters between the back surface 25b of the rack 25 and the cam surface 32 of the recessed guide portion 34 so that the relative movement of the rack 25 in the return direction is prevented. The pinion gear 21 is therefore prevented from rotating in the opposite direction. The take-up spindle 4, which is integrally connected to the rotating disc 17, the planetary gear 15 and the outer clutch ring 12 by way of the roller pins 10, is therefore prevented from rotating in the webbing-releasing direction. Even immediately after completion of a tightening operation of the wound webbing by the pretensioner 3, the drive means 6 can therefore prevent winding-out of the webbing. The return-preventing mechanism for the rack 25 can be arranged at any location insofar as a surface of the rack 25 and the roller pin (dog) 36 can be brought into contact with each other at the initial position.

Figure 9:
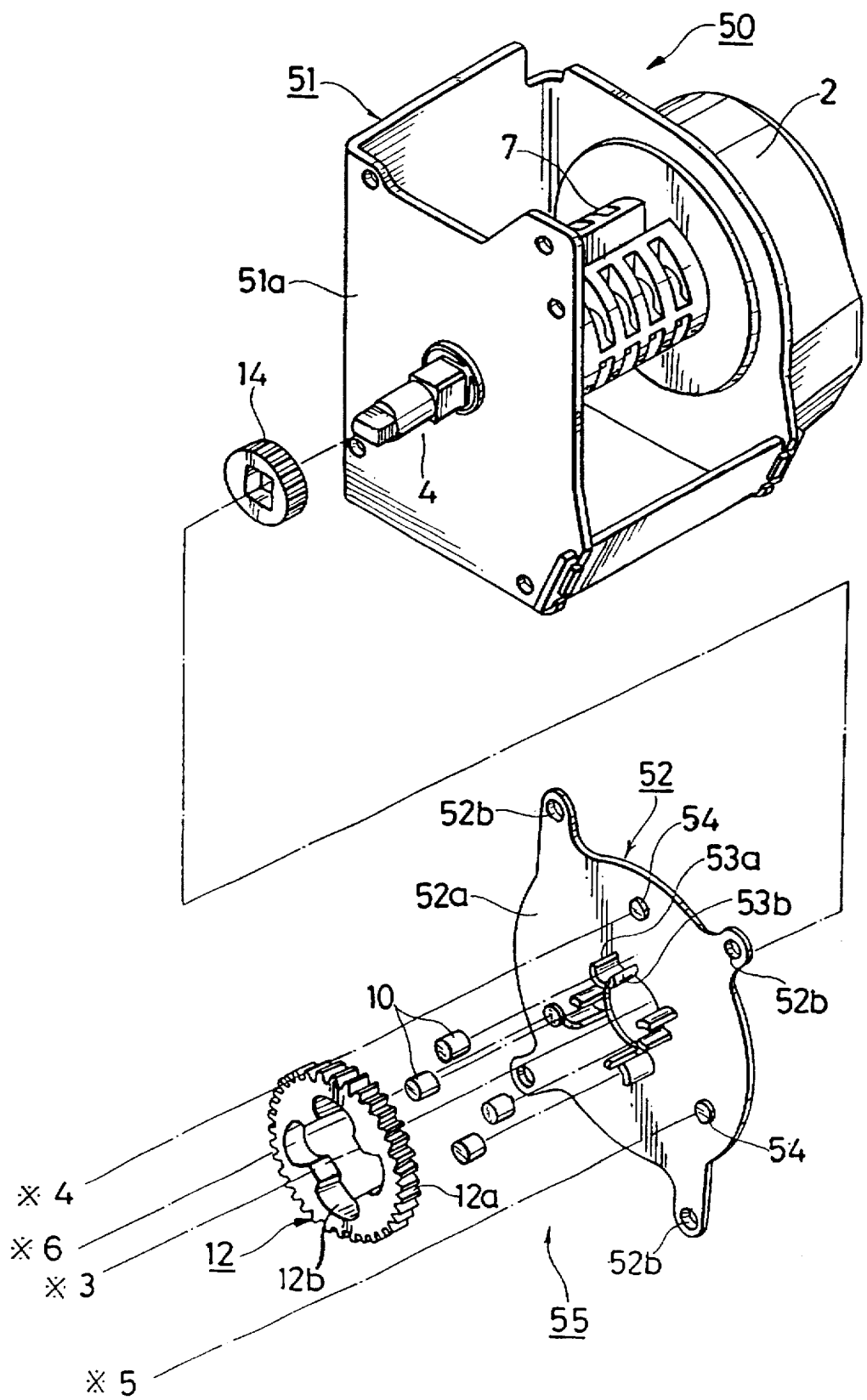
FIG. 9 is an exploded fragmentary view of a pretensioner-equipped seat belt according to a second embodiment of the present invention.
Figure 10:
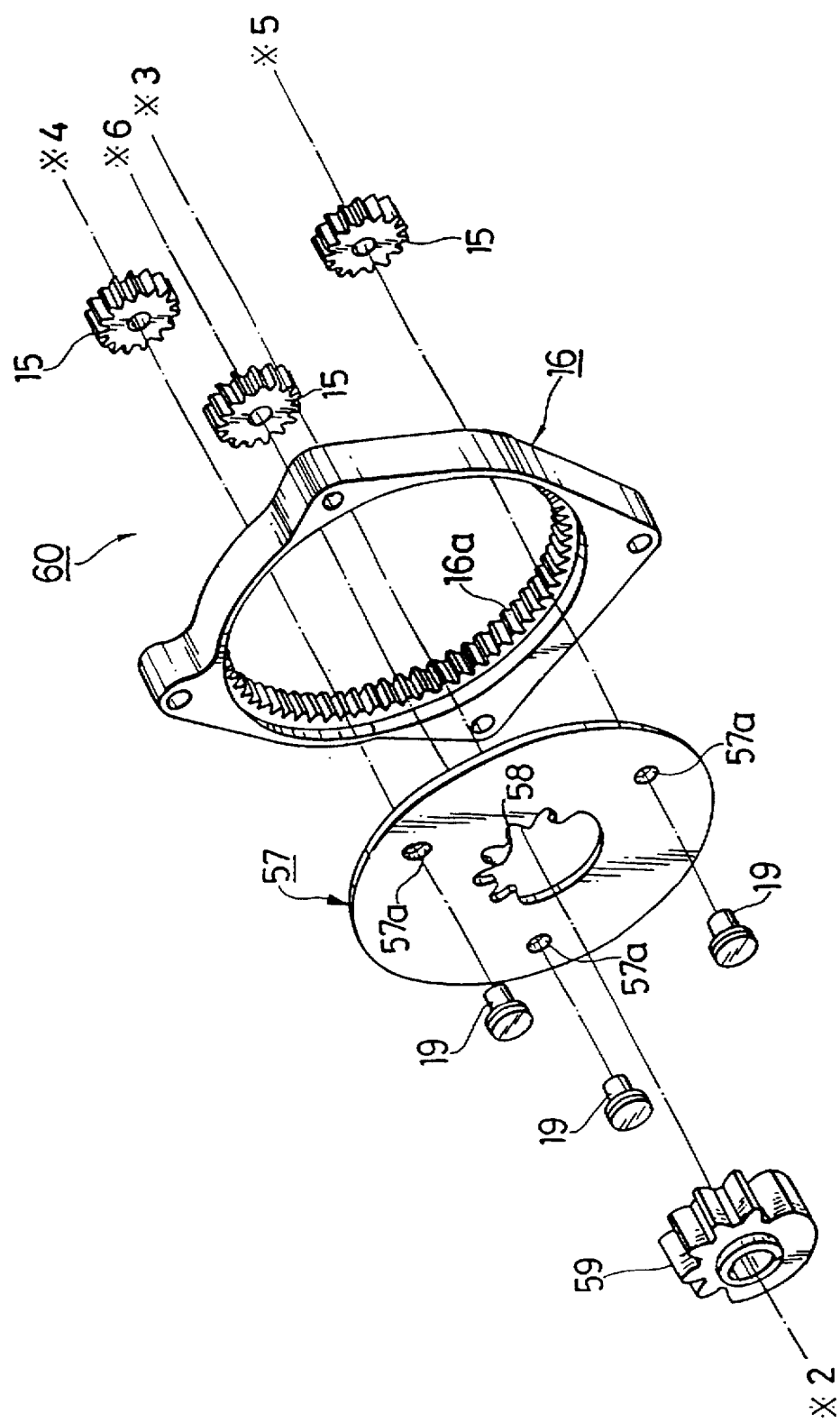
FIG. 10 is another exploded fragmentary view of the pretensioner-equipped seat belt retractor shown in FIG. 9.

Referring next to FIGS. 9 and 10, the pretensioner-equipped seat belt retractor according to the second embodiment of the present invention will be described. In FIGS. 9 and 10, elements of structure similar to the corresponding ones in the pretensioner-equipped seat belt retractor 1 according to the first embodiment are designated by like reference numerals. Detailed description of these like elements is omitted herein.

Substantially like the above-described pretensioner-equipped seat belt retractor 1 according to the first embodiment, the pretensioner-equipped seat belt retractor of the second embodiment, which is designated as numeral 50, has a pretensioner on one of side walls 51a of a retractor base 51 formed substantially in a square U shape. The pretensioner is provided with drive means 6 for rotating a take-up spindle 4 in such a direction that slack of the webbing is eliminated. The pretensioner uses a clutch mechanism 55 and a planetary gear unit 60 instead of the clutch mechanism 30 and the planetary gear unit 35 of the pretensioner 6 in the first embodiment.

The clutch mechanism 55 is provided with an outer clutch ring 12, roller pins 10 and as holding means, a holder 52. The outer clutch ring 12 has four cam surfaces 12b so that wedge-shaped spaces are formed between the respective cam surfaces 12b and an outer peripheral surface of a clutch ring 14. The roller pins 10 are arranged in the respective wedge-shaped spaces of the outer clutch ring 12. The holder 52 is secured on the side wall 51a so that the roller pins 10 are prevented from moving in a clutch ring engaging direction.

The holder 52 is made of a synthetic resin material such as a polyacetal or nylon or a metallic material, for example, a thin-sheet spring material such as an aluminum, zinc, stainless steel or steel sheet, and is provided with a substantially disc-shaped base plate portion 52a and four pairs of roller pin holding fingers 53a,53b extending along an axis of the base plate portion 52a at right angles relative to the base plate portion 52a. The base plate portion 52a defines a circular hole, through which the take-up spindle 4 is inserted, and holes 52b for facilitating mounting of the base plate portion 52a on the retractor base 51. The base plate portion 52a is fastened together with a planetary gear case 16 and a rack gear case 22 on an outer surface of the side wall 51a. Tip portions of the roller holding fingers 53a,53b are inserted in the corresponding wedge-shaped spaces of the outer clutch ring 12 disposed on an outer side of the holder 52, whereby the roller pins 10 are maintained out of engagement with the outer peripheral surface of the clutch ring 14. In addition, the base plate portion 52 is also provided with positioning beads 54 which are useful upon assembly of planetary gears 15.

The planetary gear unit 60 comprises planetary gears 15 and as a carrier member, a rotating disc 57 rotatably supporting the planetary gears 15 thereon. The planetary gears 15 are arranged between internal teeth 16a, which are formed on a planetary gear case 16 fixed on an outer surface of the holder 52, and the outer clutch ring 12. Formed through the rotating disc 57 are through-holes 57a and a central hole 58. Pins 19 with the respective planetary gears 15 rotatably supported thereon press-fitted in the through-holes 57a, respectively, and a pinion gear 59 is fitted in the central hole 58. The planetary gears 15 are caused to revolve by the rotating disc 57 which rotates integrally with the pinion gear 59. Rotation of the pinion gear 59 therefore causes the outer clutch ring 12 to rotate at a higher speed.

From the relationship between the speed increasing ratio of the planetary gear unit 60 and the length of the wound webbing to be tightened, the pinion gear meshed with the rack 25 may not rotate fully over 360° even when the rack 25 moves over its full stroke. In such a case, the pinion gear, like the pinion gear 59 illustrated in FIG. 10, may have only a required number of teeth and any remaining circumferential portion thereof presents a cylindrical surface having a diameter equal to a root diameter of the pinion gear. Needless to say, the contour of the central hole 58 of the rotating disc 57 has a shape corresponding to the contour of the pinion gear 59.

A description will next be made of procedures upon assembling the above-described pretensioner on the retractor in the second embodiment.

First, the outer clutch ring 12 and the planetary gears 15 are assembled on the holder 52. Here, the outer clutch ring 12 is assembled with the cam surfaces 12b registered at positions where the roller pins 10 do not engage the clutch ring 14, and the roller pins 10 are attached to the corresponding roller pin holding fingers 53a,53b. Further, the planetary gears 15 are positioned relative to the holder 52 by the positioning beads 54. The positioning beads 54 are short projections for defining the initial positions of the planetary gears 15 upon assembling the same. As each planetary gear 15 has a play in the direction of its axis and is readily released from the held state upon actuation of the pretensioner, the positioning beads 54 do not give any adverse effect on the rotation of the planetary gear unit 60.

Next, the planetary gear case 16 is assembled. The internal teeth 16a have been machined so that, upon assembly of the planetary gear case 16, the planetary gear case 16 and the planetary gears 15 can be brought into engagement when the holes of the planetary gear case 16 and the holes 52b of the holder 52, said former and latter holes being both employed for mounting the planetary gear case 16 and the holder 52 on the side wall 51a of the retractor base 51, have been registered.

The rotating disc 57 is assembled further. To define the initial position of the rack 25, the position of the pins 19 for rotatably supporting the planetary gears 15 and the phase of the teeth of the central hole 58 in which the pinion gear 59 is fitted are determined based on the initial position of the rack 25. Incidentally, the rotating disc 57 and the pinion gear 59 may be formed integrally from the beginning.

As is appreciated from the foregoing, the pretensioner-equipped seat belt retractor 50 according to the second embodiment can bring about, in addition to advantages similar to those available from the pretensioner-equipped seat belt retractor 1 of the first embodiment, the advantage that the assembling readiness upon assembling the pretensioner on the retractor is significantly improved.

Figure 11:
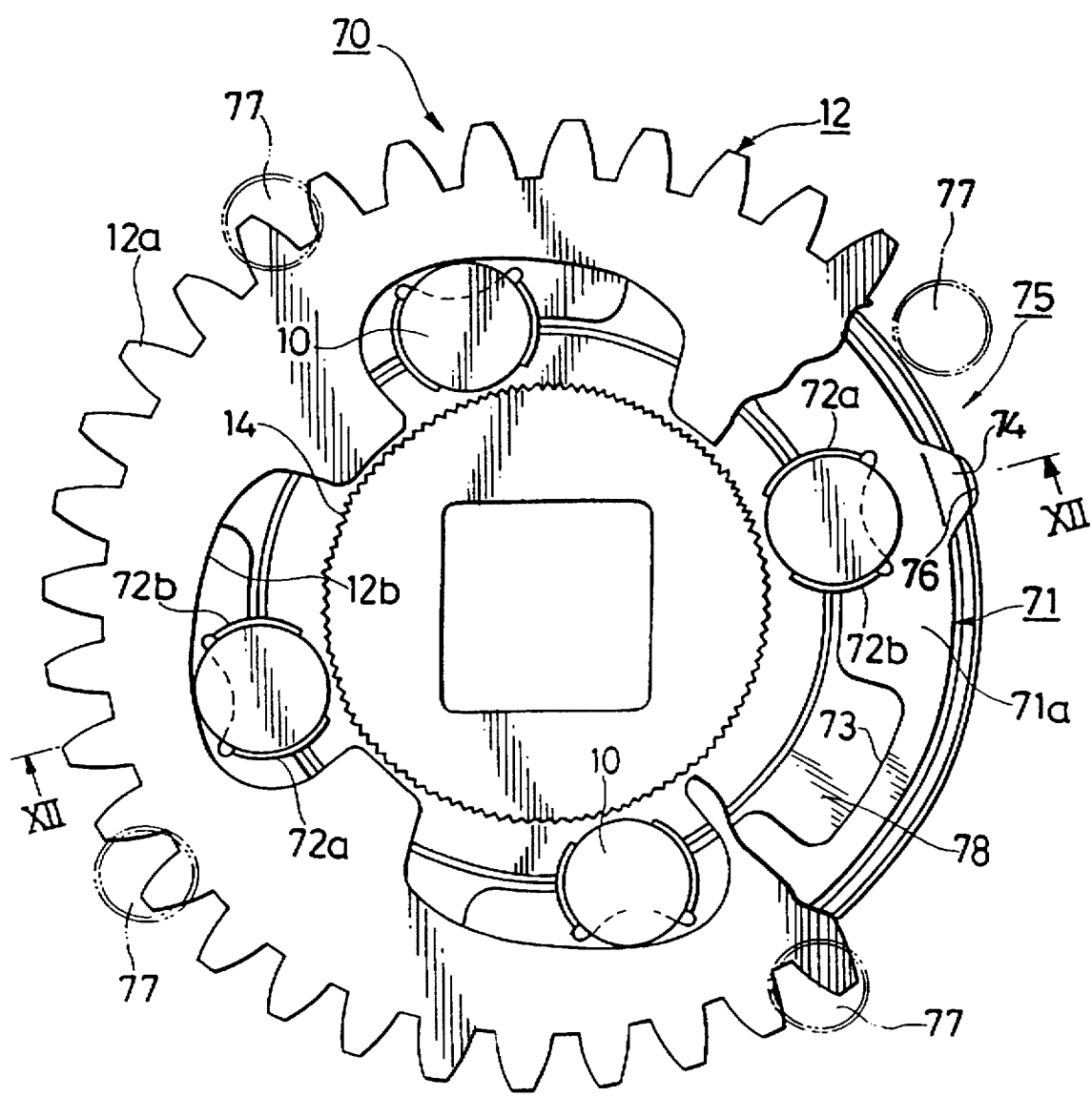
FIG. 11 is an enlarged fragmentary view of a clutch mechanism in a pretensioner-equipped seat belt retractor according to a third embodiment of the present invention.
Figure 12:
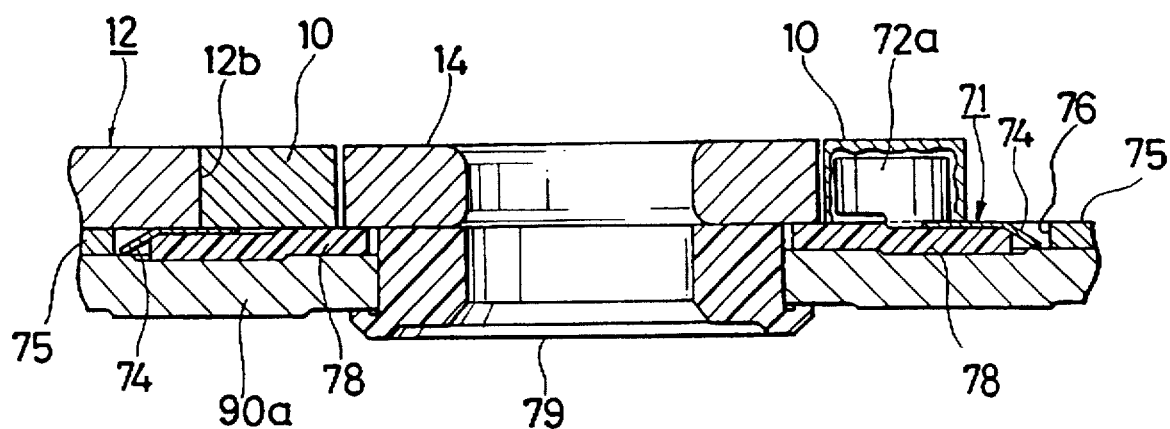
FIG. 12 is a cross-sectional view of the clutch mechanism shown in FIG. 11, taken in the direction of arrows XII—XII.
Figure 16:
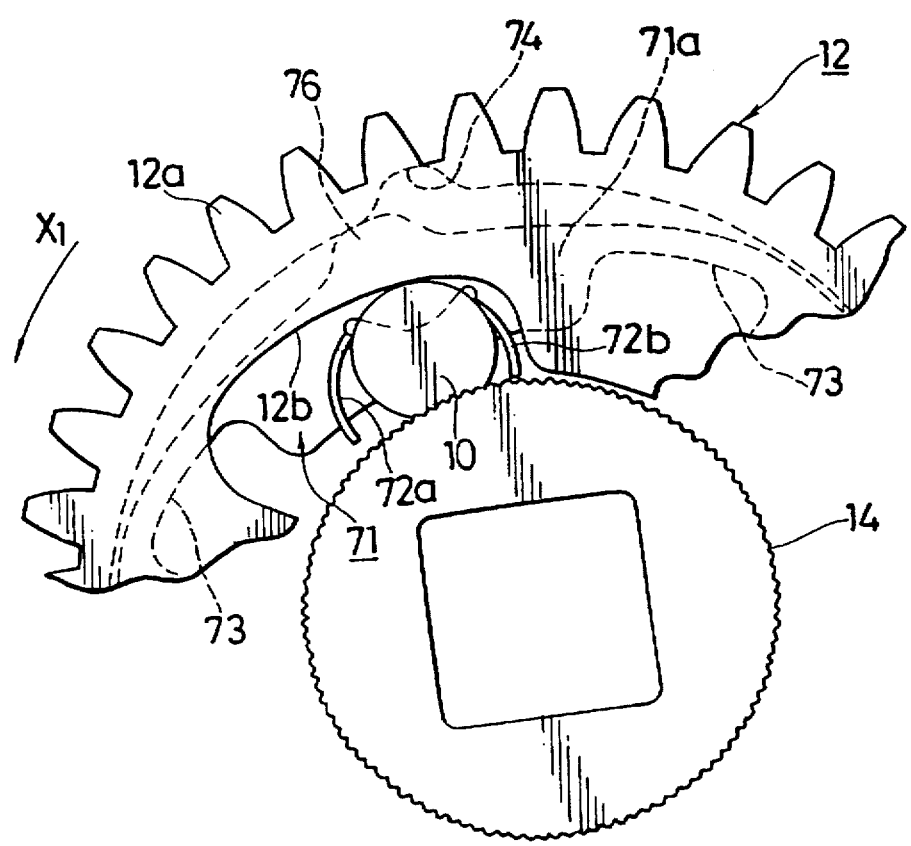
FIG. 16 is an enlarged fragmentary view for explaining the manner of operation of the clutch mechanism shown in FIG. 11.

Referring now to FIGS. 11 and 16, the clutch mechanism in the pretensioner-equipped seat belt retractor according to the third embodiment of the present invention will be described. In FIGS. 11 and 12, elements of structure similar to the corresponding ones in the clutch mechanisms 30,55 in the above-described embodiments are designated by like reference numerals. Detailed description of these like elements is omitted herein.

The clutch mechanism, which is designated as numeral 70, is provided with an outer clutch ring 12, roller pins 10, a holder plate 71, a holder base 75 and an annular spacer 78. The outer clutch ring 12 has four cam surfaces 12b which form wedge-shaped spaces between the cam surfaces and an outer peripheral surface of a clutch ring 14. The roller pins 10 are arranged in the respective wedge-shaped spaces of the outer clutch ring 12. The holder plate 71 and the holder base 75, in combination, constitute holding means secured on a side wall 90a of a retractor base so that the roller pins 10 are prevented from moving in a clutch ring engaging direction. The annular spacer 78 is arranged between the holder plate 71 and the side wall 90a of the retractor base.

The holder plate 71 is provided with a substantially disc-shaped base plate portion 71a and resilient holding fingers 72a,72b. The base plate portion 71a defines a circular hole in which a take-up spindle 14 supported via a bushing 79 on the side wall 90a of a retractor base extends, while the resilient holding fingers 72a,72b are 4 pairs of holding fingers formed bent so that the holding fingers extend along an axis of the base plate portion 71a. Four holding tab portions 74 formed at equal intervals on and extending out from an outer peripheral edge of the base plate portion 71a are maintained in engagement with a groove 76 in the holder base 75. When a rotational torque of at least a predetermined value is applied to the resilient holding fingers 72a,72b, the holder plate 71 is therefore allowed to rotate relative to the side wall 90a of the retractor base while encountering rotational resistance. In addition, indented portions 73 which, when a rotational torque of at least a predetermined value is applied, are deformed and trigger disengagement of the holding tab portions 74 from the groove 76 are formed in an inner peripheral edge of the base plate portion 71a.

Tip portions of the resilient holding fingers 72a,72b are inserted in the respective wedge-shaped spaces of the outer clutch ring 12 arranged outside the clutch ring 14, and resiliently hold the roller pins 10 in the state that the roller pins 10 are maintained out of engagement with the outer peripheral surface of the clutch ring 14.

Although not illustrated in the drawings, the holder base 75 has a similar external contour as the holder 52 in the above-described second embodiment. The holder base 75 is fastened together with the planetary gear case 16 and the rack gear case 22 and is fixed on the outer surface of the side wall 90a of the retractor base. Further, the holder base 75 is provided with four cylindrical engaging posts 77 which are fitted in corresponding lock holes formed in the side wall 90a of the retractor base so that movement of the holder base 75 is inhibited.

The holder plate 71, the holder base 75 and the spacer 78 are made of a synthetic resin material such as a polyacetal or nylon or a metallic material, e.g., a thin-sheet spring material such as an aluminum, zinc, stainless steel or steel sheet. In particular, the holder plate 71 must be made of a material which permits ready deformation of the resilient holding fingers 72a,72b.

A description will next be made of the operation of the clutch mechanism 70.

Figure 13:
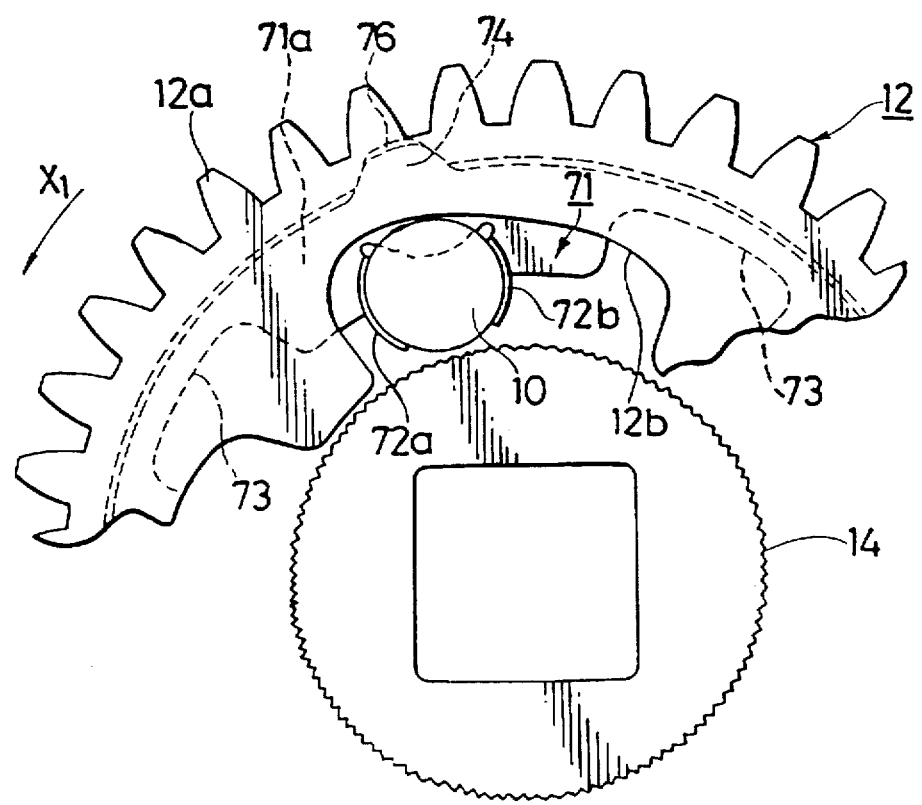
FIG. 13 is an enlarged fragmentary view for explaining the manner of operation of the clutch mechanism shown in FIG. 11.
Figure 14:
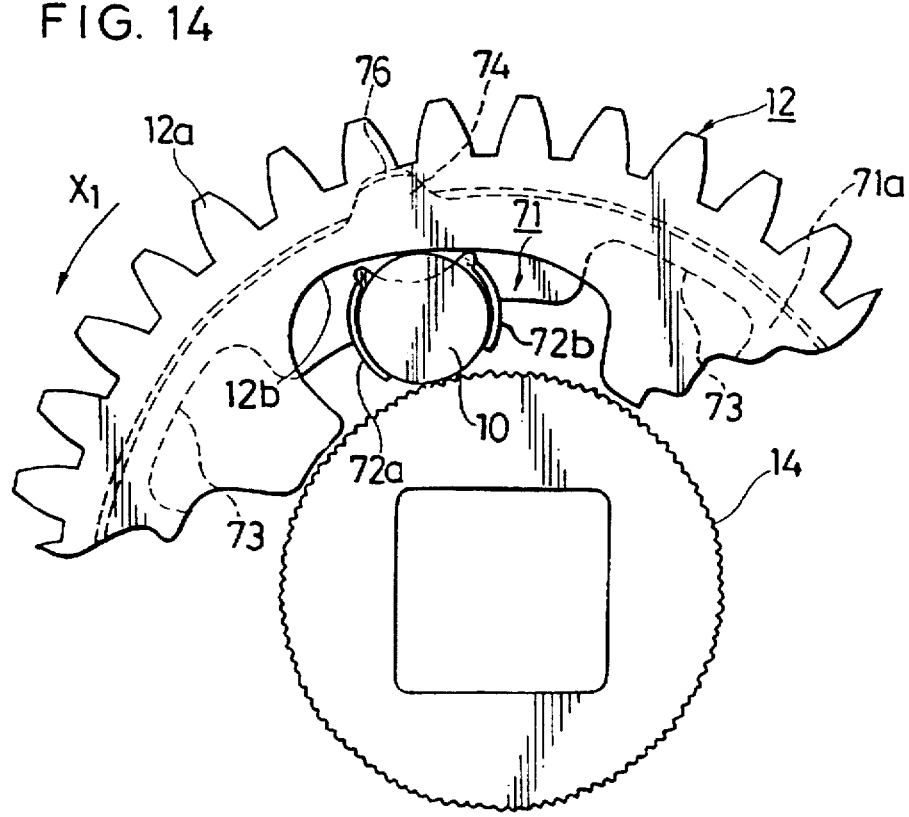
FIG. 14 is an enlarged fragmentary view for explaining the manner of operation of the clutch mechanism shown in FIG. 11.

During normal running of a vehicle, the outer clutch ring 12 and the roller pins 10 are maintained out of engagement with the clutch ring 14 as shown in FIG. 13. When the pretensioner is actuated and the above-described drive means 6 rotates and drives the outer clutch ring 12 in the direction of arrow $X_1$, the roller pins 10 are biased toward the central axis of the take-up spindle by the corresponding cam surfaces 12b as depicted in FIG. 14. At this time, the resilient holding fingers 72a,72b of the holder plate 71, owing to their resilient or elastic deformation, permit the movement of the roller pins 10 toward the central axis of the take-up spindle until the roller pins 10 surely enter between the outer peripheral surface of the clutch ring 14 and the respective cam surfaces 12b.

Figure 15:
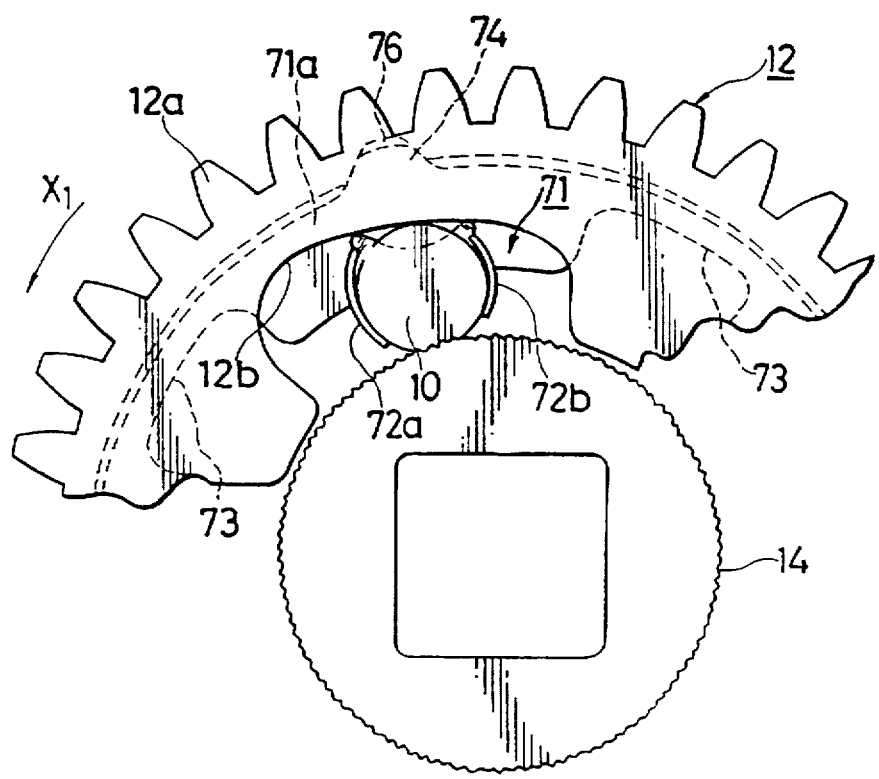
FIG. 15 is an enlarged fragmentary view for explaining the manner of operation of the clutch mechanism shown in FIG. 11.

When the roller pins 10 move to the points where the roller pins 10 are allowed to surely enter between the outer peripheral surface of the clutch ring 14 and the corresponding cam surfaces 12b, rotation of the outer clutch ring 12 is transmitted to the clutch ring 14 so that the clutch ring 14 and roller pins 10 rotate in the direction of arrow $X_1$ integrally with the outer clutch ring 12. As is illustrated in FIG. 15, the indented portions 73 of the holder plate 71 are therefore deformed so that the holding tab portions 74 begin to gradually disengage from the groove 76 of the holder base 75.

When the outer clutch ring 12 rotates further, the indented portions 73 are deformed significantly as shown in FIG. 16. Further, the base plate portion 71a is also deformed in its entirety. The holding tab portion 74 therefore completely disengages from the groove 76 of the holder base 75.

Since the holder base 75 is prevented from movement by the engaging posts 77 fitted in the lock holes of the side wall 90a of the retractor base at this time, the indented portions 73 of the holder plate 71 is surely deformed so that the holding tab portions 74 are allowed to disengage from the groove 76 of the holder base 75 without failure.

Further, the resilient holding fingers 72a,72b of the holder plate 71 are constructed in such a way that the roller pins 10 can easily move toward the central axis of the take-up spindle but encounter resistance when they move outwardly in a radial direction of the take-up spindle. Described specifically, each paired resilient holding fingers 72a,72b are bent and drawn on a radially outer side at a position where the associated roller pin 10 is approximately halved as viewed in the radial direction of the holder plate 71. The paired resilient holding fingers 72a,72b therefore have higher rigidity on radially outer sides thereof so that the roller pin 10 is prevented from readily slipping outwards in the radial direction. On the opposite side of the position where the associated roller pin 10 is approximately halved, said opposite side being on the side of the central axis of the take-up spindle, the resilient holding fingers 72a,72b primarily holds the associated roller pin 10 by their resiliency.

By the deformation which the holding tab portions 74 undergo upon their disengagement from the groove 76 of the holder base 75, the roller pins 10 are forcedly pressed against the clutch ring 14 so that their engagement is ensured.

When the outer clutch ring 12 is rotated further by the drive means 6, the outer clutch ring 12 causes the clutch ring 14 to integrally rotate in the direction of arrow $X_1$ via the roller pins 10 so that the take-up spindle 4 is rotated in the webbing-winding direction. The webbing 20 is therefore wound in, thereby eliminating slack of the webbing.

Even after the outer clutch ring 12 rotated and the holding tab portions 74 have disengaged from the groove 76, the holding tab portions 74 are maintained in contact against an inner surface of the holder base 75 so that frictional resistance is produced. The holder plate 71 therefore rotates relative to the side wall 90a of the retractor base while encountering rotational resistance. It is therefore possible to apply constant rotational resistance against the roller pins 10 which are moving in the direction of arrow $X_1$.

In the clutch mechanism 70 according to the third embodiment, the roller pins 10 can be immediately brought into engagement again with the clutch ring 14 and the outer clutch ring 12 even if the roller pins 10 bitten between the clutch ring 14 and the outer clutch ring 12 disengage once for one or another reason. Even when the drive force considerably varies like the situation immediately after actuation of the drive means, the roller pins 10 can be always maintained in meshing engagement between the clutch ring 14 and the outer clutch ring 12 and the drive force of the outer clutch ring 12 can be surely transmitted to the clutch ring 14.

Figure 17:
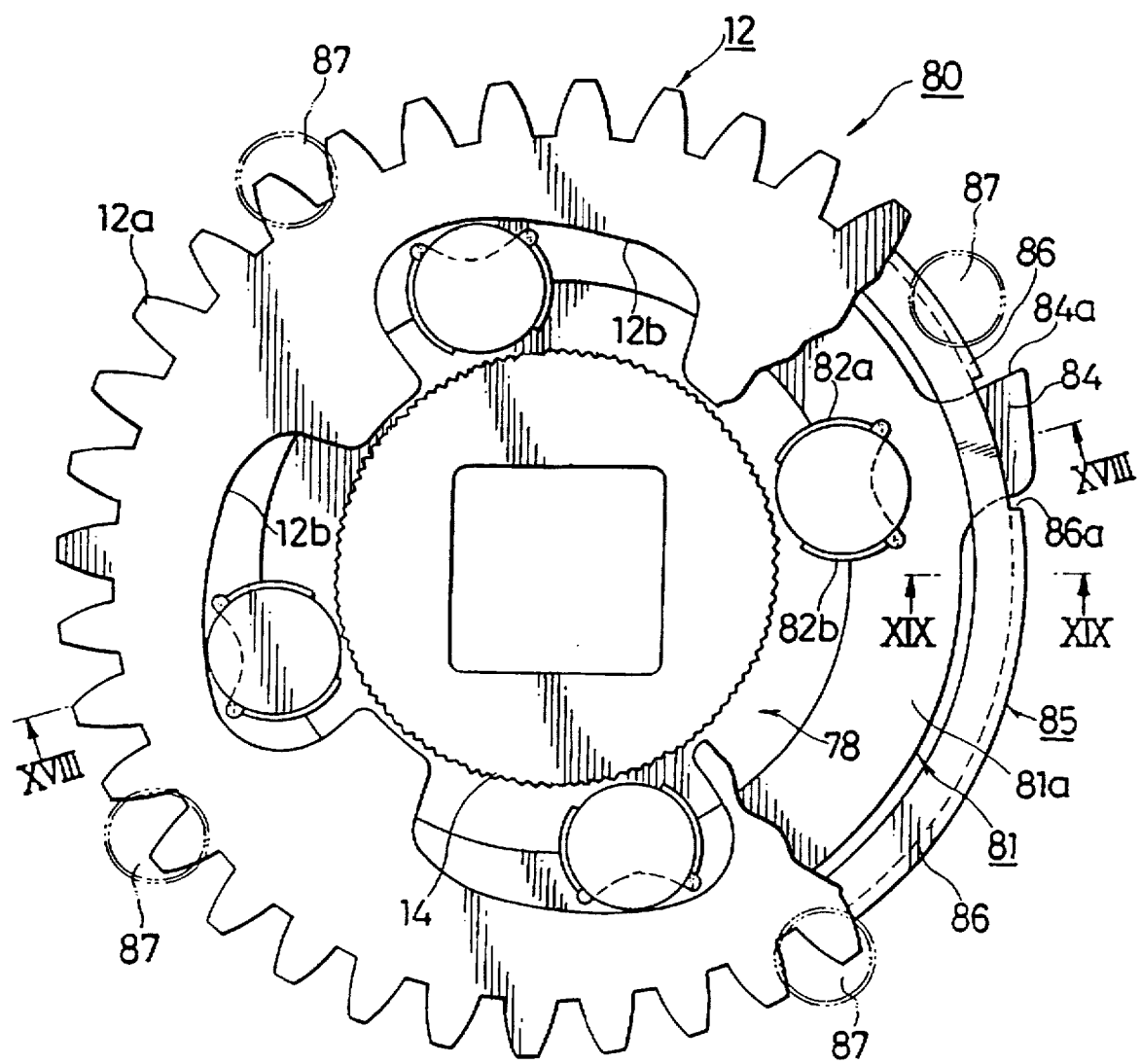
FIG. 17 is an enlarged fragmentary view of a clutch mechanism in a pretensioner-equipped seat belt retractor according to a fourth embodiment of the present invention.
Figure 18:
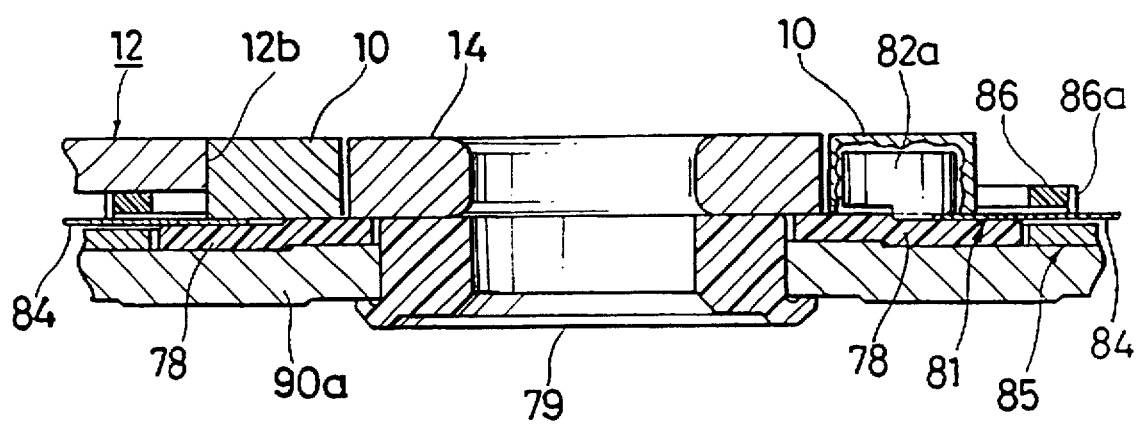
FIG. 18 is a cross-sectional view of the clutch mechanism shown in FIG. 17, taken in the direction of arrows XVIII—XVIII.
Figure 19:
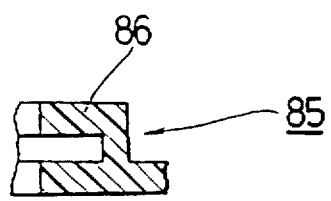
FIG. 19 is a cross-sectional view of the clutch mechanism shown in FIG. 17, taken in the direction of arrows XIX—XIX.

Referring finally to FIGS. 17 to 19, the clutch mechanism in the pretensioner-equipped seat belt retractor according to the fourth embodiment of the present invention will be described. In FIGS. 17 and 18, elements of structure similar to the corresponding ones in the clutch mechanism 70 in the third embodiment are designated by like reference numerals. Detailed description of these like elements is omitted herein.

The clutch mechanism, which is designated at numeral 80, is provided with an outer clutch ring 12 and roller pins 10. The outer clutch ring 12 has four cam surfaces 12b which form wedge-shaped spaces between the cam surfaces and an outer peripheral wall of a clutch ring 14. The roller pins 10 are arranged in the respective wedge-shaped spaces of the outer clutch ring 12. The clutch mechanism 80 uses a holder plate 81 and a holder base 85 in place of the holder plate 71 and the holder base 75 which, in combination, make up the holding means in the clutch mechanism 70 of the third embodiment.

The holder plate 81 is provided with a substantially disc-shaped base plate portion 81a and four pairs of resilient holding fingers 82a,82b. The base plate portion 81a defines a circular hole in which a take-up spindle 4 supported via a bushing 79 on a side wall 90a of a retractor base extends, while the resilient holding fingers 82a,82b are bent to extend along an axis of the base plate portion 81a. On an outer peripheral edge of the base plate portion 81a, at least one tab portion 84 is arranged so that the tab portion 84 extends out from the outer peripheral edge (the illustrated embodiment is provided with a pair of tab portions). On the holder base 85, an annular rib 86 having a turned square U-shaped cross-section as shown in FIG. 19 is arranged as an acted part so that the annular rib 86 extends out from the holder base 85. The holder plate 81 is therefore set with the tab portions 84 extending out through corresponding holding opening portions 86a and is secured on the holder base 85. In addition, Further, the holder base 85 is provided with four cylindrical engaging posts 87 which are fitted in corresponding lock holes formed in the side wall 90a of the retractor base so that movement of the holder base 85 is inhibited.

An edge portion 84a is formed as an acting member at one end of each tab portion 84. When a rotational torque of at least a predetermined value is applied to the resilient holding fingers 82a,82b, the tab portion 84 rotates while shearing off the annular rib 86. Namely, like the holder plate 71 in the above-described third embodiment, the holder plate 81 is designed so that, when a rotational torque of at least a predetermined value is applied, the holder plate 81 can rotate relative to the side wall 90a of the retractor base while encountering rotational resistance.

The holder plate 81 and the holder base 85 are made of a synthetic resin material such as a polyacetal or nylon or a metallic material, e.g., a thin-sheet spring material such as an aluminum, zinc, stainless steel or steel sheet. It is preferred to form the holder plate 81 with a harder material than the holder base 85. In other words, it is preferred to choose materials in such a combination that the tab portions 84 can shear off the annular ribs 86.

A description will next be made of the operation of the clutch mechanism 80.

When the pretensioner is actuated and the abovedescribed drive means 6 causes the outer clutch ring 12 to rotate in the direction of arrow $X_1$, the roller pins 10 which are inhibited by the holder plate 81 from moving in the rotating direction are biased toward the central axis of the take-up spindle by the corresponding cam surfaces 12b. At this time, the resilient holding fingers 82a,82b of the holder plate 81, owing to their resilient or elastic deformation, permit the movement of the roller pins 10 toward the central axis of the take-up spindle until the roller pins 10 surely enter between the outer peripheral surface of the clutch ring 14 and the respective cam surfaces 12b.

When the roller pins 10 move to the points where the roller pins 10 are allowed to surely enter between the outer peripheral surface of the clutch ring 14 and the corresponding cam surfaces 12b, rotation of the outer clutch ring 12 is transmitted to the clutch ring 14 so that the clutch ring 14 and roller pins 10 rotate in the direction of arrow $X_1$ integrally with the outer clutch ring 12. When the force with which the roller pins 10 are about to rotate in the direction of arrow $X_1$ reaches at least a predetermined value and a rotational torque of at least a predetermined value is applied to the resilient holding fingers 82a,82b, the tab portions 84 of the holder plate 81 begin to rotate while shearing off the annular ribs 86.

When the outer clutch ring 12 is rotated further by the drive means 6, the outer clutch ring 12 integrally rotates and drives the clutch ring 14 in the direction of arrow $X_1$ via the roller pins 10 so that the take-up spindle 4 is rotated in the webbing-winding direction. The webbing 20 is therefore wound so that slack of the webbing is eliminated.

Even if the holder plate 81 begins to rotate at this stage, the tab portions 84 shear off the annular ribs 86 to produce shear resistance while the annular ribs 86 have not been completely sheared off and still remain. The holder plate 82 therefore rotates relative to the side wall 90a of the retractor base while encountering rotational resistance. To the roller pins 10 which are moving in the direction of arrow $X_1$, constant rotational resistance can therefore be applied.

In the clutch mechanism 80 according to the fourth embodiment, the roller pins 10, as in the clutch mechanism 70 according to the third embodiment, can also be immediately brought into engagement again with the clutch ring 14 and the outer clutch ring 12 even if the roller pins 10 bitten between the clutch ring 14 and the outer clutch ring 12 disengage once for one or another reason. Even when the drive force considerably varies like the situation immediately after actuation of the drive means, the roller pins 10 can be always maintained in meshing engagement between the clutch ring 14 and the outer clutch ring 12 and the drive force of the outer clutch ring 12 can be surely transmitted to the clutch ring 14. By changing the number of the tab portions 84 or the length of the annular ribs 86 as parts to be sheared off, it is possible to set an angular stroke which gives optimal rotational resistance.

In the fourth embodiment described above, the edge portions 84a as an acting member shear off the annular ribs 86 as acted portions. Instead of such shearing off, the acting members may cause plastic deformation of the acted portions.

Needless to say, the clutch mechanism, the speed-increasing gear transmission, the return-preventing mechanism and the like in the present invention are not limited to the constructions of the above-described respective embodiments and can take various structures.

For example, the clutch mechanism in the present invention is not limited to the constructions of the clutch mechanism 30, 55, 70 and 80 in the respective embodiments described above and, insofar as the objects of the present invention can be achieved, any known clutch mechanisms can also be used. Although the above embodiments of the present invention were described using cylindrical roller pins as engaging elements, spherical engaging elements can also be used. Further, the constructions and shapes of the cam surface of the outer clutch ring as a rotary drive member, the holding means, the fixing means for the holding means, and the like can be modified as needed.

According to the pretensioner-equipped seat belt retractor of each of the above-described embodiments of the present invention, the rack is pushed by the pressure of gas to rotate the pinion gear in the event of collision of the vehicle. It is therefore unnecessary to provide the gas generator case with an opening through which a piston rod or the like extends to transmit a drive force. The gas pressure is therefore effectively used substantially in its entirety as a drive force for the rack. Further, rotation of the pinion gear is increased by the speed-increasing gear transmission and is then transmitted at the thus—increased speed to the rotary drive member, so that the rack can fully rotate the take-up spindle in the webbing-winding direction with a short rack stroke. The pretensioner can therefore be constructed compact.

The clutch mechanism is arranged between the take-up spindle and the rotary drive member. The pinion gear, the rack, and the gears making up the speed-increasing gear transmission can be maintained in such a state that their teeth are meshed with each other even in an initial stage. Even when the rack is abruptly pushed by the expanding pressure of the drive gas, the teeth of the individual gears do not hit each other at tip portions thereof. It is therefore possible to prevent breakage of the teeth and also to smoothly transmit the drive force to the take-up spindle.

It is accordingly possible to provide a pretensioner-equipped compact seat belt retractor, which can effectively use the gas pressure of the drive means, can smoothly transmit a drive force, which is needed to tighten the wound webbing, to the take-up spindle, and can also prevent any further wind-out of the webbing subsequent to completion of the tightening operation of the wound webbing.

What is claimed is:

1. A seat belt retractor with a pretensioner, comprising:

a drive mechanism;

a rotating member operably rotated in a first direction of rotation by said drive mechanism;

a retractor base;

a take-up spindle rotatably supported on said retractor base and biased in a webbing-winding direction;

a rotary drive member operably rotated in the same direction as said first direction of rotation about said take-up spindle by a rotation of said rotating member in said first direction;

a clutch mechanism disposed between said rotary drive member and said take-up spindle to transmit a rotation of said rotary drive member in said first direction of rotation to said take-up spindle, said clutch mechanism normally maintaining said rotary drive member and said take-up spindle in a non-connected state but, when said rotary drive member rotates in said first direction of rotation, bringing said rotary drive member and said take-up spindle into a connected state;

a speed-increasing gear transmission arranged between said rotating member and said rotary drive member so that a rotation of said rotating member is transmitted at an increased speed to said rotary drive member, wherein said speed-increasing gear mechanism comprises:

an internal gear mounted on said retractor base,
  a plurality of planetary gears rotatably supported by pins, which are arranged on said rotating members and maintained in meshing engagement with said internal gear, and
  an external gear arranged on an outer periphery of said rotary drive member and maintained in meshing engagement with said planetary gears;

wherein a rotation of said rotary drive member caused by a rotation of said rotating member in said first direction of rotation effects a rotation of said take-up spindle in said webbing-winding direction.

2. A seat belt retractor according to claim 1, wherein said drive mechanism has a gas generator, a cylinder and a piston movable in said cylinder and operably connected with said rotating member to cause a rotation of said rotating member in said first direction of rotation, and a gas blow-out portion of said gas generator is communicated with said cylinder in order to operably drive said piston.

3. A seat belt retractor according to claim 1, wherein a plurality of said planetary gears are rotatably supported on a plurality of pins, respectively, said pins being arranged on said rotating member, and said planetary gears being maintained in meshing engagement with said internal gear, said rotary drive member with an external gear being maintained in meshing engagement with said plurality of planetary gears, and
  said rotary drive member having an axis of rotation which is coaxial with an axis of rotation of said rotating member.

4. A seat belt retractor with a pretensioner, comprising:
a rack;
drive means for causing said rack to linearly move in a first direction;
a pinion gear arranged in meshing engagement with said rack so that said pinion gear is rotated in a first direction of rotation by movement of said rack in said first direction;
a rotary drive member rotatable in said first direction of rotation by rotation of said pinion gear in said first direction of rotation;
a retractor base;
a take-up spindle supported for rotation on said retractor base and biased in a webbing-winding direction;
a clutch mechanism disposed between said rotary drive member and said take-up spindle, said clutch mechanism normally maintaining said rotary drive member and said take-up spindle in a non-connected state but, when said rotary drive member rotates in said first direction of rotation, bringing said rotary drive member and said take-up spindle into a connected state; and a speed-increasing gear transmission arranged between said pinion gear and said rotary drive member so that rotation of said pinion gear is transmitted at an increased speed to said rotary drive member;

wherein said speed-increasing gear transmission comprises a rotating disc arranged in meshing engagement with said pinion gear; an internal gear mounted on the retractor base; a planetary gear supported for rotation on a pin disposed on said rotating disc and maintained in meshing engagement with said internal gear; and an external gear arranged on an outer periphery of said rotary drive member and maintained in meshing engagement with said planetary gear.

5. A seat belt retractor according to claim 4, wherein said clutch mechanism is provided with positioning means for positioning said planetary gear.

6. A seat belt retractor according to claim 4, wherein said pinion gear has only a required number of teeth and any remaining circumferential portion thereof presents a cylindrical surface having a diameter equal to a root diameter of said pinion gear.

7. A seat belt retractor with a pretensioner, comprising:
a rack;
drive means for causing said rack to linearly move in a first direction;
a pinion gear arranged in meshing engagement with said rack so that said pinion gear is rotated in a first direction of rotation by movement of said rack in said first direction;
a rotary drive member rotatable in said first direction of rotation by rotation of said pinion gear in said first direction of rotation;
a retractor base;
a take-up spindle supported for rotation on said retractor base and biased in a webbing-winding direction;
a clutch mechanism disposed between said rotary drive member and said take-up spindle, said clutch mechanism normally maintaining said rotary drive member and said take-up spindle in a non-connected state but, when said rotary drive member rotates in said first direction of rotation, bringing said rotary drive member and said take-up spindle into a connected state; and
a return preventing mechanism for preventing said rack from linearly moving a second direction which is opposite to said first direction of linear movement;
wherein said return preventing mechanism comprises a rack gear case provided with a cam surface and fixed on said retractor base, said cam surface forming a wedge-shaped space flaring in said first direction of linear movement of said rack; a dog disposed in said wedge-shaped space; and a biasing member biasing said dog in a direction in which said wedge-shaped space becomes narrower.

8. A seat belt retractor according to claim 7, further comprising:
an initial positioning member for defining an assembled position of said rack in said first direction of linear movement of said rack.

9. A seat belt retractor with a pretensioner, comprising:
a rack;
drive means for causing said rack to linearly move in a first direction;
a pinion gear arranged in meshing engagement with said rack so that said pinion gear is rotated in a first direction of rotation by movement of said rack in said first direction;

a rotary drive member rotatable in said first direction of rotation by rotation of said pinion gear in said first direction of rotation;

a retractor base;

a take-up spindle supported for rotation on said retractor base and biased in a webbing-winding direction; and a clutch mechanism disposed between said rotary drive member and said take-up spindle, said clutch mechanism normally maintaining said rotary drive member and said take-up spindle in a non-connected state but, when said rotary drive member rotates in said first direction of rotation, bringing said rotary drive member and said take-up spindle into a connected state;

wherein said clutch mechanism comprises a clutch ring fixed on said take-up spindle and having a circular outer circumference; an engaging element; a holder supported on said retractor base and holding said engaging element at a predetermined position; and a cam surface formed on said rotary drive member and forming a wedge-shaped spacing which flares in said first direction of rotation of said rotary drive member;

wherein said holder is attached to said retractor base via means for producing rotational resistance between said holder and said retractor base when a rotational torque of at least a predetermined value is applied to said engaging element; and wherein said resistance producing means comprises a holding tab portion which is normally maintained in engagement with an engaged portion of a holder base mounted on said retractor base but, when a rotational torque of at least a predetermined value is applied to said holder, is released from the engagement and is then brought into contact with said holder base to produce frictional resistance.

10. A seat belt retractor with a pretensioner, comprising:

a rack;

drive means for causing said rack to linearly move in a first direction;

a pinion gear arranged in meshing engagement with said rack so that said pinion gear is rotated in a first direction of rotation by movement of said rack in said first direction;

a rotary drive member rotatable in said first direction of rotation by rotation of said pinion gear in said first direction of rotation;

a retractor base;

a take-up spindle supported for rotation on said retractor base and biased in a webbing-winding direction; and a clutch mechanism disposed between said rotary drive member and said take-up spindle, said clutch mechanism normally maintaining said rotary drive member and said take-up spindle in a non-connected state but, when said rotary drive member rotates in said first direction of rotation, bringing said rotary drive member and said take-up spindle into a connected state;

wherein said clutch mechanism comprises a clutch ring fixed on said take-up spindle and having a circular outer circumference; an engaging element; a holder supported on said retractor base and holding said engaging element at a predetermined position; and a cam surface formed on said rotary drive member and forming a wedge-shaped spacing which flares in said first direction of rotation of said rotary drive member;

wherein said holder is attached to said retractor base via means for producing rotational resistance between said holder and said retractor base when a rotational torque of at least a predetermined value is applied to said engaging element; and wherein said resistance producing means comprises an acting member formed on said holder; and an acted member attached to said retractor base and located on a moving path of said acting member so that said acted member is deformable by said acting member.

11. A seat belt retractor according to claim 10, wherein said acting member is an edge portion formed on said holder, said acted portion is an annular rib of said holder base, and said annular rib is sheared off by said edge portion.

\* \* \* \* \*